US012719691B2

(12) United States Patent
Herder, III et al.

(10) Patent No.: US 12,719,691 B2
(45) **Date of Patent: *Aug. 25, 2026**

(54) PRIVACY-PRESERVING BIOMETRIC AUTHENTICATION USING ASYMMETRICALLY LOADED SERVERS

(71) Applicant: Badge Inc., Lewes, DE (US)

(72) Inventors: Charles H. Herder, III, Newark, CA (US); Tina P. Srivastava, Newark, CA (US); Young Hyun Kwon, Newark, CA (US)

(73) Assignee: Badge Inc., Lewes, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/303,167

(22) Filed: Aug. 18, 2025

(65) Prior Publication Data

US 2026/0149593 A1 May 28, 2026

Related U.S. Application Data

(63) Continuation of application No. 18/957,354, filed on Nov. 22, 2024, now Pat. No. 12,395,342.

(51) Int. Cl.

*H04L 29/06* (2006.01)
*G06F 21/00* (2013.01)
*H04L 9/00* (2022.01)
*H04L 9/08* (2006.01)
*H04L 9/32* (2006.01)

(52) U.S. Cl.

CPC ............ *H04L 9/3231* (2013.01); *H04L 9/008* (2013.01); *H04L 9/0869* (2013.01)

(58) Field of Classification Search

None

See application file for complete search history.

(56) References Cited

U.S. PATENT DOCUMENTS

| | | | |
|---|---|---|---|
| 6,697,947 | B1 | 2/2004 | Matyas, Jr. |
| 7,272,245 | B1 | 9/2007 | Layton |
| 11,063,941 | B2 | 7/2021 | Teranishi et al. |
| 11,223,478 | B2 | 1/2022 | Eldefrawy et al. |
| 11,329,980 | B2 | 5/2022 | Callahan et al. |
| 12,206,783 | B2 | 1/2025 | Streit |

(Continued)

FOREIGN PATENT DOCUMENTS

| | | | |
|---|---|---|---|
| EP | 00001175749 | B1 | 7/2005 |
| JP | 02006166433 | A | 6/2006 |

(Continued)

OTHER PUBLICATIONS

Shahri, et al., "A secure network access protocol (SNAP)," Proceedings of the Eighth IEEE Symposium on Computers and Communications. ISCC 2003, 2003, pp. 809-814 vol. 2, doi: 10.1109/ISCC.2003.1214217. (Year 2003).

(Continued)

*Primary Examiner* — Lisa C Lewis
(74) *Attorney, Agent, or Firm* — Merchant & Gould P.C.

(57) ABSTRACT

A method for using biometric data to authenticate a subject as an individual whose biometric data has been previously obtained. In this embodiment, the method utilizes a series of computer processes with asymmetrically loaded servers that are configured with one-time values for use in multi-party computing to perform the authentication.

22 Claims, 12 Drawing Sheets

(56) References Cited

U.S. PATENT DOCUMENTS

| | | | | |
|---|---|---|---|---|
| 2001/0031075 | A1 | 10/2001 | Fujii | |
| 2006/0123239 | A1 | 6/2006 | Martinian et al. | |
| 2007/0118758 | A1 | 5/2007 | Takahashi et al. | |
| 2007/0140145 | A1 | 6/2007 | Kumar et al. | |
| 2008/0025575 | A1 | 1/2008 | Schonberg et al. | |
| 2008/0072068 | A1 | 3/2008 | Wang et al. | |
| 2008/0172730 | A1* | 7/2008 | Sandhu | H04L 63/06 726/9 |
| 2008/0235515 | A1 | 9/2008 | Yedidia et al. | |
| 2009/0271634 | A1 | 10/2009 | Boult et al. | |
| 2011/0126024 | A1 | 5/2011 | Beatson et al. | |
| 2011/0302420 | A1 | 12/2011 | Davida | |
| 2012/0087550 | A1 | 4/2012 | Akkermans et al. | |
| 2012/0195475 | A1 | 8/2012 | Abiko | |
| 2014/0105403 | A1 | 4/2014 | Baldi et al. | |
| 2014/0139318 | A1 | 5/2014 | Malpani et al. | |
| 2014/0372766 | A1 | 12/2014 | Ryan, Jr. | |
| 2015/0347781 | A1 | 12/2015 | Patey et al. | |
| 2015/0349958 | A1* | 12/2015 | Lindell | G06F 21/31 713/168 |
| 2016/0034585 | A1 | 2/2016 | Rokhlenko et al. | |
| 2016/0125416 | A1 | 5/2016 | Spencer et al. | |
| 2017/0085562 | A1 | 3/2017 | Schultz et al. | |
| 2017/0141920 | A1 | 5/2017 | Herder et al. | |
| 2017/0243225 | A1 | 8/2017 | Kohli | |
| 2017/0337364 | A1 | 11/2017 | Whaley et al. | |
| 2018/0007037 | A1* | 1/2018 | Reese | H04L 63/0838 |
| 2018/0114226 | A1 | 4/2018 | Desai et al. | |
| 2018/0365119 | A1 | 12/2018 | Lazier et al. | |
| 2019/0116180 | A1 | 4/2019 | Teranishi et al. | |
| 2019/0260721 | A1 | 8/2019 | O'Regan et al. | |
| 2019/0311100 | A1* | 10/2019 | Lindell | G06F 21/32 |
| 2019/0311148 | A1 | 10/2019 | Andrade | |
| 2019/0312731 | A1 | 10/2019 | Eldefrawy | |
| 2019/0372760 | A1 | 12/2019 | Zheng | |
| 2020/0153627 | A1 | 5/2020 | Wentz | |
| 2020/0186528 | A1 | 6/2020 | Fan | |
| 2020/0228340 | A1 | 7/2020 | Blackhurst | |
| 2020/0250669 | A1* | 8/2020 | Radu | G06Q 20/385 |
| 2020/0259638 | A1* | 8/2020 | Carmignani | H04L 9/085 |
| 2020/0267144 | A1 | 8/2020 | Wagner | |
| 2020/0293643 | A1 | 9/2020 | Wang | |
| 2021/0014063 | A1 | 1/2021 | Arora | |
| 2021/0044429 | A1 | 2/2021 | Yang | |
| 2021/0141896 | A1 | 5/2021 | Streit | |
| 2021/0194874 | A1 | 6/2021 | Herder, III | |
| 2021/0336792 | A1 | 10/2021 | Agrawal | |
| 2022/0006952 | A1* | 1/2022 | Okuike | H04N 21/44008 |
| 2022/0261466 | A1 | 8/2022 | Gelardi et al. | |
| 2024/0015152 | A1 | 1/2024 | Herder, III et al. | |
| 2024/0121098 | A1 | 4/2024 | Herder, III et al. | |

FOREIGN PATENT DOCUMENTS

| | | | |
|---|---|---|---|
| JP | 02007148470 | A | 6/2007 |
| JP | 02008502071 | A | 1/2008 |
| JP | 02011144746 | A | 7/2011 |
| KR | 1020180000849 | A | 1/2018 |
| KR | 00101845192 | B1 | 4/2018 |
| WO | 02005069534 | | 7/2005 |
| WO | 02005122467 | A1 | 12/2005 |
| WO | 02014108835 | A2 | 7/2014 |
| WO | 02017075063 | A1 | 5/2017 |
| WO | 02017195886 | A1 | 11/2017 |
| WO | 02018222211 | A1 | 12/2018 |

OTHER PUBLICATIONS

International Searching Authority, International Search Report—International Application No. PCT/US2025/056646, dated Feb. 17, 2026, together with the Written Opinion of the International Searching Authority, 11 pages.

International Searching Authority/EP, International Search Report and Written Opinion of the International Searching Authority, Application No. PCT/US2020/063968, mailed Mar. 5, 2021, 17 pages.

A.F. Al Shahriet al., A Secure Network Access Protocol (SNAP), Computers and Communication, 2003. (ISCC2003). Proceedings. Eighth IEEE Intemational Sympoisumon Jun. 30-Jul. 3, 2003, Piscataway, NJ, USA, IEEE, US, Jan. 1, 2003), pp. 809-804.

Herder et al.,"Trapdoor Computational Fuzzy Extractors and Stateless Cryptographically-Secure Physical Unclonable Functions," IEEE Transactions on Dependable and Secure Computing, vol. PP, No. 99, 18 pages (Mar. 1, 2016).

Herder et al.,"A Stateless Cryptographically-Secure Physical Unclonable Function," IEEE Transactions on Dependable and Secure Computing, 17 pages, (2015).

Rivest et al., "A Method for Obtaining Digital Signatures and Public-Key Cryptosystems," Communications of the ACM, vol. 21, No. 2, pp. 120-126, (Feb. 1978).

Herder et al.,"Trapdoor Computational Fuzzy Extractors," International Association for Cryptologic Research, vol. 20141118:190315, Nov. 15, 2014, 14 pages.

Fuller et al., "Computational Fuzzy Extractors," International Conference on Computer Analysis of Images and Patterns, Springer, Berlin, Heidelberg, Dec. 1, 2013, pp. 174-193.

Nandakumar et al., "Fingerprint-Based Fuzzy Vault: Implementation and Performance," IEEE Transactions on Information Forensics and Security, vol. 2, No. 4, Dec. 2007, pp. 744-757.

International Searching Authority, International Search Report—International Application No. PCT/US2016/061647, dated Feb. 21, 2017, together with the Written Opinion of the International Searching Authority, 14 pages.

U.S. Patent and Trademark Office / LinChang, Non-Final Rejection, U.S. Appl. No. 15/349,781, dated Jul. 23, 2018, 25 pages.

U.S. Patent and Trademark Office / LinChang, Final Rejection, U.S. Appl. No. 15/349,781, dated Feb. 14, 2019, 29 pages.

U.S. Patent and Trademark Office / LinChang, Non-Final Rejection, U.S. Appl. No. 15/349,7481, dated Jun. 12, 2019, 25 pages.

European Patent Office, Extended European Search Report, Application No. 168651412, dated Jun. 21, 2019, 5 pages.

International Searching Authority / KR, International Search Report and Written Opinion of the International Searching Authority, Application No. PCT/USZOI9/032996, mailed Sep. 24, 2019, 13 pages.

Dodis et al., Fuzzy Extractors: How to Generate Strong keys from Biometrics and Other Noisy Data, Apr. 17, 2004, Advances in Cryptology—Eurocrypt 2004, LNCS, Springer, pp. 523-540, 978-3-540-21935-4, XP019005038.

European Patent Office, Communication pursuant to Article 94(3) EPC, Application No. 168651412, dated Feb. 7, 2020, 6 pages.

International Searching Authority/European Patent Office, International Search Report and Written Opinion of the International Searching Authority, Application No. PCT/U82020/015607, mailed Apr. 17, 2020, 15 pages.

Wang, Yi (Alice) et al., "Global Ridge Orientation Modeling for Partial Fingertip Identification", IEEE Transactionson Pattern Analysis and Machine Intelligence, vol. 33, No. 1, Jan. 2011 (16 pages).

Keller, Marcel "MP-SPDZ: A Versatile Framework for Multi-Party Computation", CCS '20: Proceedings of the 2020 ACM SIGSAC Conference on Computer and Communications Security, Nov. 2, 2020, 30 pages.

Damgard et al. "Practical Covertly Secure MPC for Dishonest Majority—or: Breaking the SPDZ Limits", Dept of Computer Science, Aarhus University et al. , 2013, 45 pages.

medium.com "Kubernetes Fundamentals for Absolute Beginners: Architecture & Components", https://medium.com/the-programmer/kubernetes-fundamentals-for-absolute-beginners, Jan. 3, 2021, accessed Mar. 29, 2024, 20 pages.

* cited by examiner

PRIVACY-PRESERVING BIOMETRIC AUTHENTICATION USING ASYMMETRICALLY LOADED SERVERS

CROSS REFERENCE TO RELATED APPLICATIONS

The present application is a continuation of U.S. patent application Ser. No. 18/957,354 filed Nov. 22, 2024, the disclosure of which is incorporated by reference herein in its entirety.

TECHNICAL FIELD

The present invention relates to biometric authentication, and more particularly to privacy-preserving biometric authentication.

BACKGROUND ART

Biometric-based authentication provides a powerful function in today's digital world: It allows people to authenticate themselves securely using biometrics without having to remember a complex password or carry around a hardware token. During enrollment or registration, an individual's biometric is captured, and the biometric or biometric template is stored. (A biometric template can be created from biometric data, for example by using algorithms involving feature extraction or using machine learning or computer vision algorithms.) Then, during a subsequent authentication, a subject's biometric is captured and compared with or matched against the stored biometric or biometric template. This approach, however, comes with problematic security and privacy issues. For example, in traditional biometric matching, the system must be able to access the template in plain-text in order to run the matching algorithm—this opens a vulnerability for attackers to steal the template or breach a database to obtain users' biometric data or other confidential information, similar to how attackers breach password databases. The damages are worse with biometrics, as the users cannot reset them. Fingerprints cannot be reset like passwords. The biometrics are either stored centrally or locally. When the biometrics are stored in one or more centralized databases, the databases are a honey pot for hackers to target. When the biometrics are stored locally, such as in each user's device like an iPhone, there are additional drawbacks including, for example, that if a user loses her device, she can no longer authenticate because the biometric she enrolled with was stored on her lost device—so there is no stored biometric available to match against.

Today's "multiparty computation" or "MPC" techniques, when applied to biometrics, still require the biometric template from enrollment to be stored on a server. During authentication, the subject's biometric template on a client is compared with the biometric template on the server using multiparty computation, wherein the server and client perform MPC to compute a match score of the two templates. Although this technique avoids the parties' exchanging biometric templates (as occurs in classical biometric authentication), the approach is not privacy preserving, for example because both the server and client learn this match score. Existing approaches that use MPC are too inefficient to scale to millions of users. For example, certain approaches require excessive computation (such as on the order of seconds per user per authentication), while others require excessive communication (sometimes >10 MB exchanged per user per authentication over dozens or even hundreds of rounds), while others have a weak security model (such as insecure with one or more actively malicious servers). Many such approaches require the server to store the biometric template in plaintext, just as in traditional biometric authentication. One approach shards the data between the client and server, which prevents a single point of failure at the server, but this introduces a requirement to have the same client device be used in future authentication, because the shard or shards stored by the client device are required in future authentication. Therefore, this approach shares the limitations of locally stored biometric authentication, because loss of the client device implies loss of the credential and ability to authenticate.

SUMMARY OF THE EMBODIMENTS

The present application describes a privacy-preserving approach to authenticate users with significant improvements over the prior art.

In one embodiment, the invention provides a method using biometric data to authenticate a subject as an individual whose biometric data has been previously obtained. (The embodiment therefore distinguishes between the individual, who was initially enrolled with biometric data, and the subject, who purports to be the individual.) The embodiment utilizes computer processes with asymmetrically loaded servers, and the computer processes include causing generation of authentication shards from a digital electronic signal characterizing a biometric of the subject and causing the authentication shards to be distributed to, and stored by, a first plurality of servers in an array of servers, wherein the individual's biometric data has been formed into enrollment shards that have been distributed to, and stored by, a second plurality of servers in the array of servers.

The embodiment further includes causing each server in the array of servers, to be assigned a proxy for a one-time value, and to store the proxy, for use only once in a multiparty computation with other servers in the array under criteria by which (i) the one-time values are individually indistinguishable from uniformly random values, (ii) each proxy for a one-time value is selected from the group consisting of the one-time value itself and a seed for the one-time value, (iii) the one-time values distributed to the first plurality of servers is constrained by a first specific value, (iv) the one-time values distributed to the second plurality of servers is constrained by a second specific value, and (v) in each of the first and second pluralities at least one of the proxies for the one-time value is the one-time value itself.

Finally, the embodiment includes causing performance of a data exchange process, which includes multiparty computation, involving a subset of the first and second pluralities of servers in the array to develop information relating to authentication of the subject; and causing processing of the authentication information to generate an output value corresponding to a determination whether the subject is authenticated as the individual.

In a related embodiment, in the process of causing assignment of the proxy for the one-time value to each server, causing configuration of only one of the proxies in the first plurality of servers, and only one of the proxies in the second plurality of servers, as the one-time value itself.

As a further option in at least one instance, in the process of causing assignment of the proxy to each server, and the proxy is a seed, configuring the seed for use in a pseudo-random number generator shared across a relevant set of servers of the array, and configuring each server receiving the seed to use the seed in the pseudorandom number generator to generate and store the corresponding one-time value.

As another option, in at least one instance, in the process of causing assignment of the proxy to each server, and the proxy is a seed, configuring the seed for use by such server, after being caused to access an encrypted data item in an external resource, to decrypt the data item, such server being thereafter caused to store the decrypted data item as such server's one-time value.

In yet another option, in at least one instance, in the process of causing assignment of the proxy to each server, and the proxy is a seed, configuring the seed for use by such server as a token by which such server gains access to a gated storage system, and such server is caused to download from the gated storage system a corresponding one-time value and to store the one-time value.

In a further option, in at least one instance, in the process of causing assignment of the proxy to each server, and the proxy is a seed, configuring the seed for use by such server, after being caused to access an encrypted data item in an external resource, to decrypt the data item, such server being thereafter caused to store the decrypted data item as such server's one-time value.

In another embodiment, the invention provides a non-transitory computer readable storage medium encoded with instructions that, when executed by a computing facility, establish processes for using biometric data to authenticate a subject as an individual whose biometric data has been previously obtained. The processes, with asymmetrically loaded servers, includes causing generation of authentication shards from a digital electronic signal characterizing a biometric of the subject and causing the authentication shards to be distributed to, and stored by, a first plurality of servers in an array of servers, wherein the individual's biometric data has been formed into enrollment shards that have been distributed to, and stored by, a second plurality of servers in the array of servers.

The embodiment further includes the non-transitory computer-readable medium, wherein in the process of causing assignment of the proxy for the one-time value to each server, causing configuration of only one of the proxies in the first plurality of servers, and only one of the proxies in the second plurality of servers, as the one-time value itself.

As an option, the invention includes the non-transitory computer-readable medium, wherein, in at least one instance, in the process of causing assignment of the proxy to each server, and the proxy is a seed, configuring the seed for use in a pseudorandom number generator shared across a relevant set of servers of the array, and configuring each server receiving the seed to use the seed in the pseudorandom number generator to generate and store the corresponding one-time value.

As a further option, the invention includes the non-transitory computer-readable medium, wherein, in at least one instance, in the process of causing assignment of the proxy to each server, and the proxy is a seed, configuring the seed for use by such server, after being caused to access an encrypted data item in an external resource, to decrypt the data item, such server being thereafter caused to store the decrypted data item as such server's one-time value.

As a further option, the invention includes the non-transitory computer-readable medium, wherein, in at least one instance, in the process of causing assignment of the proxy to each server, and the proxy is a seed, configuring the seed for use by such server as a token by which such server gains access to a gated storage system, and such server is caused to download from the gated storage system a corresponding one-time value and to store the one-time value.

As a further option, the invention includes the non-transitory computer-readable medium, wherein, in at least one instance, in the process of causing assignment of the proxy to each server, and the proxy is a seed, configuring the seed for use by such server, after being caused to access an encrypted data item in an external resource, to decrypt the data item, such server being thereafter caused to store the decrypted data item as such server's one-time value.

As a further option, the invention includes the non-transitory computer-readable medium, wherein, in at least one instance, in the process of causing assignment of the proxy to each server, and the proxy is a seed, configuring the seed for use by such server as a token by which such server gains access to a gated storage system, and such server is caused to download from the gated storage system a corresponding one-time value and to store the one-time value.

As a further option, the invention includes the non-transitory computer-readable medium, wherein, in at least one instance, in the process of causing assignment of the proxy to each server, and the proxy is a seed, configuring the seed for use by such server as a token by which such server gains access to a gated storage system, and such server is caused to download from the gated storage system a corresponding one-time value and to store the one-time value.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1A:
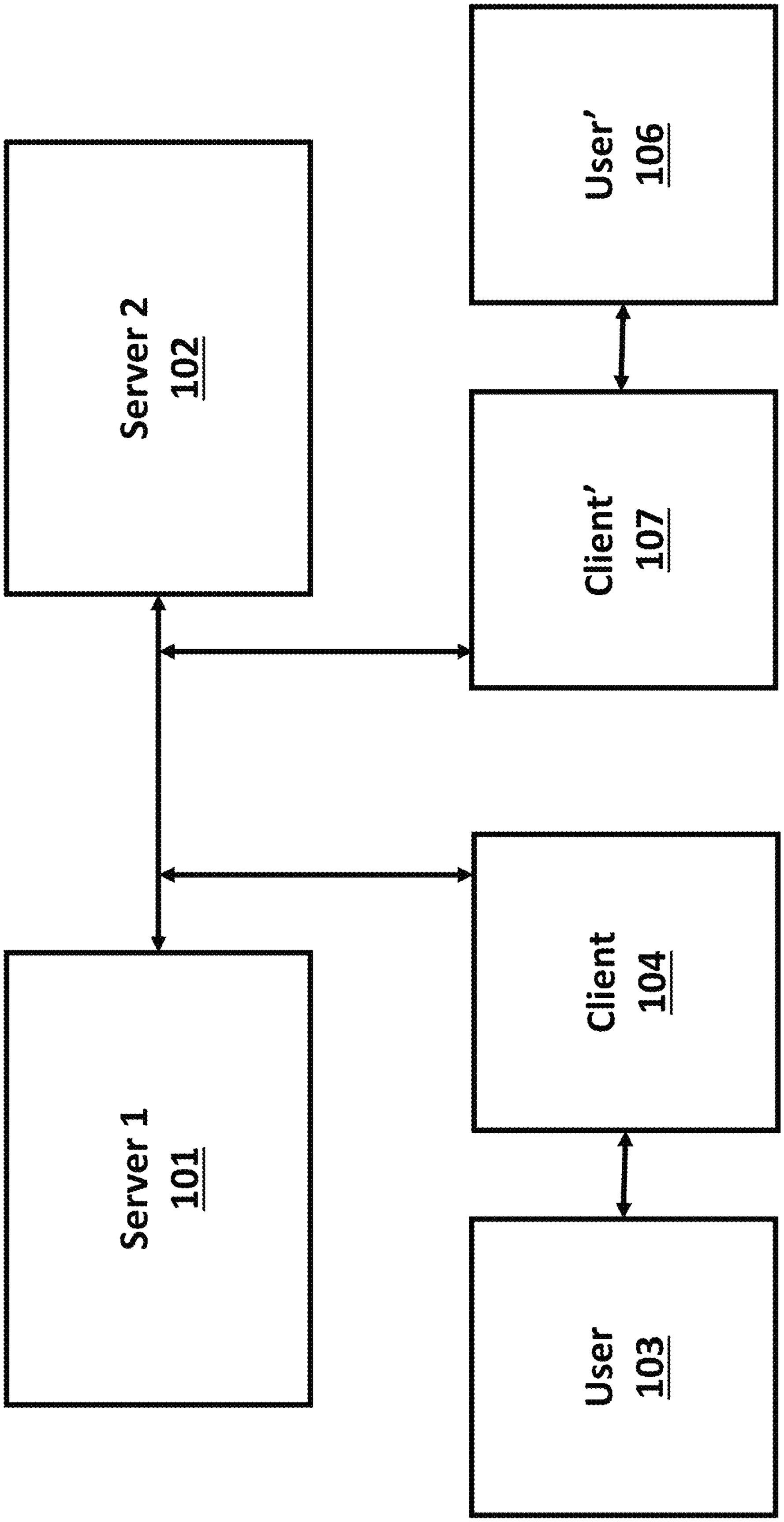
FIG. 1A is a block diagram of a computer system for performing enrollment and authentication in accordance with an embodiment of the present invention.

Definitions. As used in this description and the accompanying claims, the following terms shall have the meanings indicated, unless the context otherwise requires:

A "set" includes at least one member.

A "subset" includes a set of the entirety.

An "array of servers" is a plurality of servers.

A system of computing components is configured as "information-sharing restricted" with respect to an item of information when the item of information is being handled by a given component and the given component is prevented from sharing the information with at least one other component of the system. For purposes of this definition, an array of servers is considered a single component.

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

An "individual" is an animate or inanimate object having a unique identity, and may be a human or other organism.

A "subject" is an animate or inanimate object purporting to have the unique identity of a specific individual.

A "biometric" is a measurable characteristic of a distinct individual or of a distinct group of individuals, or a combination of such characteristics, that may be used to determine the unique identity of the individual or group. Some non-limiting examples of such measurable organic characteristics are: an iris pattern, a periocular region of a face, a retinal blood vessel pattern, a fingerprint, a genetic pattern or DNA fingerprint, a voice print, a speed or cadence of typing, a pattern of blood flow, a brain structure or electrical pattern, a behavioral signal (such as hand movements), expertise-based continuous biometrics, and a gait of the individual. An example of a measurable inorganic characteristic, when the individual is a distinct silicon wafer having transistors, is a random variation in the transistor gate delays caused by the process of manufacturing the distinct silicon wafer; such a "silicon biometric" is detectable using a ring oscillator, as is known in the art.

A "biometric value" is a categorization of a portion of a measurement of a biometric according to a property of the measurement. For example, if the biometric is an iris print, and measurement consists of imaging an iris as an array of pixels, then the relevant portion of the measurement is a single pixel in the image, and the relevant property may be a brightness or color of the pixel to be categorized. Measurement of the entire biometric may include many biometric values.

A "confidence value for a biometric value", or simply "confidence value", is a number indicating a degree of relative confidence that the corresponding biometric value was correctly categorized.

A "confident subset" of biometric data is a collection of biometric values, selected according to their respective confidence values, that is (a) large enough to uniquely identify an individual within a given universe of identifiable individuals, and (b) small enough to be repeatably obtainable across measurements of the corresponding biometric under different conditions.

A "transducer" is any device having, as an output, an electronic signal that encodes a characterization of a biometric as a set of measured biometric values. If the output of such a device is not directly digital, then the term "transducer" includes any device additionally used to transform the output into digital form.

A "computing facility" means an electronic system having components that include a computing processor and a memory storing instructions that can be executed by the computing processor. A computing facility may be found, for example, in a desktop computer, a smartphone, a tablet computer, a wearable, a smart watch, and similar electronic devices. A computing facility also may be found in embedded computing systems that perform specialized computations, for example point-of-sale machines, automated teller machines (ATMs), physical access barriers, video display kiosks, and similar electronic devices.

A value is "sharded" when it is converted into individual components that, taken alone, reveal nothing about the value but, when combined, reveal the value. For example, x can be arithmetically sharded into $[x]_1$, $[x]_2$ as:

$$[x]_1 = r \mod p$$

$$[x]_2 = x - r \mod p$$

where r is a random integer, and p is a large prime number. One can see that $x=[x]_1+[x]_2$, but $[x]_1$ and $[x]_2$ are each random (because r is random). This approach to sharding (namely arithmetic sharding) produces only one of a number of shard types, including, e.g., Shamir shards—polynomial interpolants, bitwise XOR shards, linear shards, function shares, etc.

A process recited as including "encoding and extracting into shards" may be carried out in any order, namely, in a first order, wherein the encoding precedes the extracting into shards, or in a second order, wherein the extracting into shards precedes the encoding.

As illustrated herein, a "shard" does not necessarily have to be a secret. Depending on context, the shard might be a secret or might not be a secret.

A "one-time value (OTV)" assigned to a server in an array of servers is a value for use only once by such server in a multiparty computation with other servers in the array A "proxy" for a one-time value is selected from the one-time value itself and a seed for generation of the one-time value.

A "seed" for a one-time value is a value, that, when stored by a given server in an array of servers, can be used by the given server to obtain a corresponding one-time value for use by the given server in a multiparty computation.

1 Transforming Biometric Data

Embodiments of the present invention provide computer systems and methods for transforming biometric data into a form that protects its privacy while permitting its indirect use for purposes including authentication. These embodiments are discussed below.

FIG. 1A is a block diagram of a computer system for performing enrollment and authentication in accordance with an embodiment of the present invention. FIG. 1A shows an individual (user) 103, a subject (user') 106, and at least two servers 101, 102, that constitute an array of servers. The individual 103 uses a mobile phone with software, called a client 104, (in this case is written in Javascript), which is software that runs on a web browser, and the web browser in turn runs on the individual's mobile phone. In the embodiment of FIG. 1A, the client 104 has access to the camera on the mobile phone to take pictures of the individual's face. The client 104 interacts with the user 103 and with the other entities on behalf of the user 103.

The subject (user') 106 uses a different device (client' 107), such as a different mobile phone, a laptop, a kiosk, etc. This device also runs client software.

In the embodiment of FIG. 1A, server 1, shown as item 101, is implemented in Go, and is deployed using Kubernetes in a Google Cloud Platform (e.g., in central United States). The server 101 has a Postgres database that stores the encoded shards used in the process. In addition to running a set of programs having application programming interfaces (APIs) for communicating with the server 2, shown as item 102, the set of programs running on server 101 also have APIs for communicating with the client 104. These APIs for communicating with the client 104 include, for example, APIs for enrolling, authenticating, and signing.

In the embodiment of FIG. 1A, server 2, shown as item 102, is implemented in Python, and is deployed in Amazon AWS (e.g., in eastern Europe). In this embodiment, the server 102 has a MySql database that stores the encoded shards used in the process. The server 102 has APIs similar to those of server 101, except written in Python on the server side.

In the embodiment of FIG. 1A, a series of processes are implemented, as follows.

First, an enrollment process is initiated (by the individual 103 or by another party). In this process, the client 104 requests the individual 103 to take a picture of the individual's face, and the individual 103 takes such a picture. Liveness detection is used with respect to the image of the individual's face in the picture.

Next, in the enrollment process, the client 104, using the captured image of the individual's face, creates enrollment shards, and sends the enrollment shards to the server 101 and server 102, which store the enrollment shards.

After enrollment, an authentication process is initiated (by the subject 106 or by another party). During the authentication process, the subject's client 107 requests the subject 106 to take a picture of the subject's face, and the subject 106 takes such a picture.

Next, in the authentication process, the subject's client 107, using the captured image of the subject's face, creates authentication shards, and sends the authentication shards to the server 101 and server 102, which store the authentication shards.

During a data exchange process of the authentication process, the servers 101 and 102 communicate with each other, with respect to the stored shards, to develop information relating to authentication of the subject, and each server 101, 102 sends a communication to the subject's client 107. The subject's client 107, in receipt of the communications, can then determine if the subject 106 was successfully authenticated as the individual 103. The subject's client can determine if the subject 106 was successfully authenticated without the subject 106 learning information about the enrolled individual 103.

The embodiment of FIG. 1A is privacy preserving, for example, because neither of the servers 101, 102 knows whether the subject 106 was successfully authenticated as the individual 103; neither of the servers 101, 102 nor the subject's client 107 gain access to the individual's biometric template (namely, an image of the individual's face); and neither of the servers 101, 102 gains access to the subject's biometric template (namely, an image of the subject's face).

The embodiment of FIG. 1A is also revocable, for example, because the shards stored by the servers 101, 102 are revocable. If a malicious subject 106 compromises the subject's client 107 and compromises all but one server, this embodiment prevents the malicious subject 106 from accessing information related to the individual 103. In the case of such compromise, in this embodiment, the credentials of the individual 103 (which can include the shards on the servers 101, 102) can be revoked and new credentials can be issued for the individual 103. In some embodiments, the issuing of the new shards can occur without the individual's involvement. Accordingly, if an external adversary is able to compromise all but one server, this adversary still learns nothing about the individual 103, and the credentials of the individual 103 can be revoked and new credentials issued without involving the individual 103.

In one embodiment of FIG. 1A, five sets of shards are generated during the enrollment process. Each server 101, 102 receives five sets of shards. During each authentication process, one of the sets of shards is destroyed. In this embodiment, when an authentication process is successful, a new set of shards is generated and distributed, using steps similar to the enrollment process.

This embodiment optionally includes a process to handle the case in which one or more servers in the server array goes down or is busy, offline, or otherwise unavailable. An exemplary process may include, for example, creating redundancy by creating multiple copies of each server. Another exemplary process may include performing sharding using techniques, such as Shamir shards, in which only a certain threshold number of shards are required, such as n out of m shards. In such a process, authentication is possible even when one or more servers with shards is not involved in the authentication process. In the event that one or more servers in the server array becomes unavailable, operations of enrollment and authentication can be carried out using a subset of servers in the array. Determination of the subset of servers to carry out such operations, can be based on a combination of one or more conditions including, for example: online status, availability, breach condition, capacity, location, privilege status, and security group.

The embodiment of FIG. 1A also addresses the concern of catastrophic credential loss, which can include, for example, a subject losing her password or token and an account reset is required. Account reset processes can be costly, such as because they involve expensive cost centers, users not completing their transaction, etc. Current account reset processes are not privacy-preserving, for example because they can default to having a central database of user information and the use of knowledge-based authentication (KBA), which can include asking a user questions about their favorite sports team or car they owned, to reset a user's account. This embodiment addresses catastrophic credential loss, for example because account access does not require remembering a password or having possession of a token, thereby avoiding the circumstances of requiring a reset due to a lost password or lost token.

In one embodiment, liveness detection is used to ensure the biometric is being taken of a real person. In one embodiment, liveness detection includes shining light on the face from different angles, while taking a picture of the face. In another embodiment, a neural net that is trained to detect the difference between photos of real people and photos of screens or photos is used. In one embodiment, an infrared camera is used in conjunction with an optical camera. In one embodiment, sensors detect a range of conditions, such as breathing, pulse, depth between finger print ridges. In one embodiment, the individual must participate in the liveness detection, such as by turning their head, speaking a phrase, or clicking a button. In one embodiment, the liveness indication is part of the digital electronic signal. In another embodiment, the liveness indication is contained within the shards.

In some embodiments, revocation processes do not need to include the creation of new shards. For example, regulations including the General Data Protection Regulation (GDPR) include a right to be forgotten or a right for individuals to have their personal data erased. Some embodiment's ability to perform revocation enables the right to be forgotten, even in the case of breach of servers and compromise of shards.

In some embodiments, revocation processes cause one or more shards to be useless in future authentication. In one embodiment, if the client and all but one server is compromised, an adversary learns nothing, and the credentials of the individual can be revoked and a new credentials issued. In one embodiment, a shard is a credential. In one embodiment, if the shard is revealed (such as by a breach or other compromise), the shard can be revoked and reissued. In one embodiment, a credential is a subset of the shards. In one embodiment, a credential is an encoded version of the biometric data. In one embodiment, a credential is a vector resulting from a neural net. In one embodiment, a credential is a biometric template. In one embodiment, issuing a new credential does not require the individual user. In one embodiment, the system of FIG. 1A is configured to require the individual user to issue new credentials. In another embodiment, the individual user is required to issue replacement shards. In one embodiment, a useless shard is called cancelled.

In one embodiment, the array of servers is five servers that each have unique shards and one of the servers is compromised. In one embodiment, to revoke the compromised shards, not all five servers have to be involved. There are several example ways to revoke the compromised shards, as follows (non-exhaustive list).

In one example, a subset (e.g., three) of the five servers in the array can cause the generation of new shards. The three new shards work in conjunction with the remaining two servers' original shards. The usefulness, for authentication, of the three original shards from the three servers in the subset is terminated from the authentication process. For example, if one of the three original shards was compromised, the compromised shard is made no longer useful in determining the success of future authentication attempts, and the security posture of the system is returned to that prior to the compromise of the one server.

In another example, the generation of three new shards by the three servers in the subset, terminates the usefulness of the remaining two original shards from the other two servers in the five-server array.

In another example, one server in the array deletes its shards, the action of which terminates the usefulness of all remaining shards held by the other servers in the array.

In the field of sharding, it is the case that one or more (but not every) shards being compromised does not compromise the individual's biometric. In the prior art, the compromised shards are a persistent security vulnerability. That is, they retain their usefulness to the authentication process. Thus, the security model becomes weaker with every shard that is compromised. But in embodiments of the present invention, the revocability capability (revoking the compromised shards) enables recovery of the security posture because the usefulness of the compromised shards may be terminated.

Assume a situation where a biometric has been sharded into 5 shards, and the compromise of 3 out of 5 shards would compromise the biometric. In the prior art, if one shard was compromised, only two more shards would need to be compromised to compromise the biometric. In embodiments of the present invention, however, the revocability capability enables recovery of the security posture (i.e., that 3 shards must be compromised to compromise the biometric) because the usefulness of the compromised shard may be terminated. Various embodiments uniquely allow a shard to be compromised without its compromise resulting in persistent compromising of the security of the system. The revocation capability limits the time frame during which an adversary may attempt to use a compromised shard, thereby reducing the attack surface. Because the revocation process can be performed by the servers without involvement of the client, revocation can be done very efficiently.

Figure 1B:
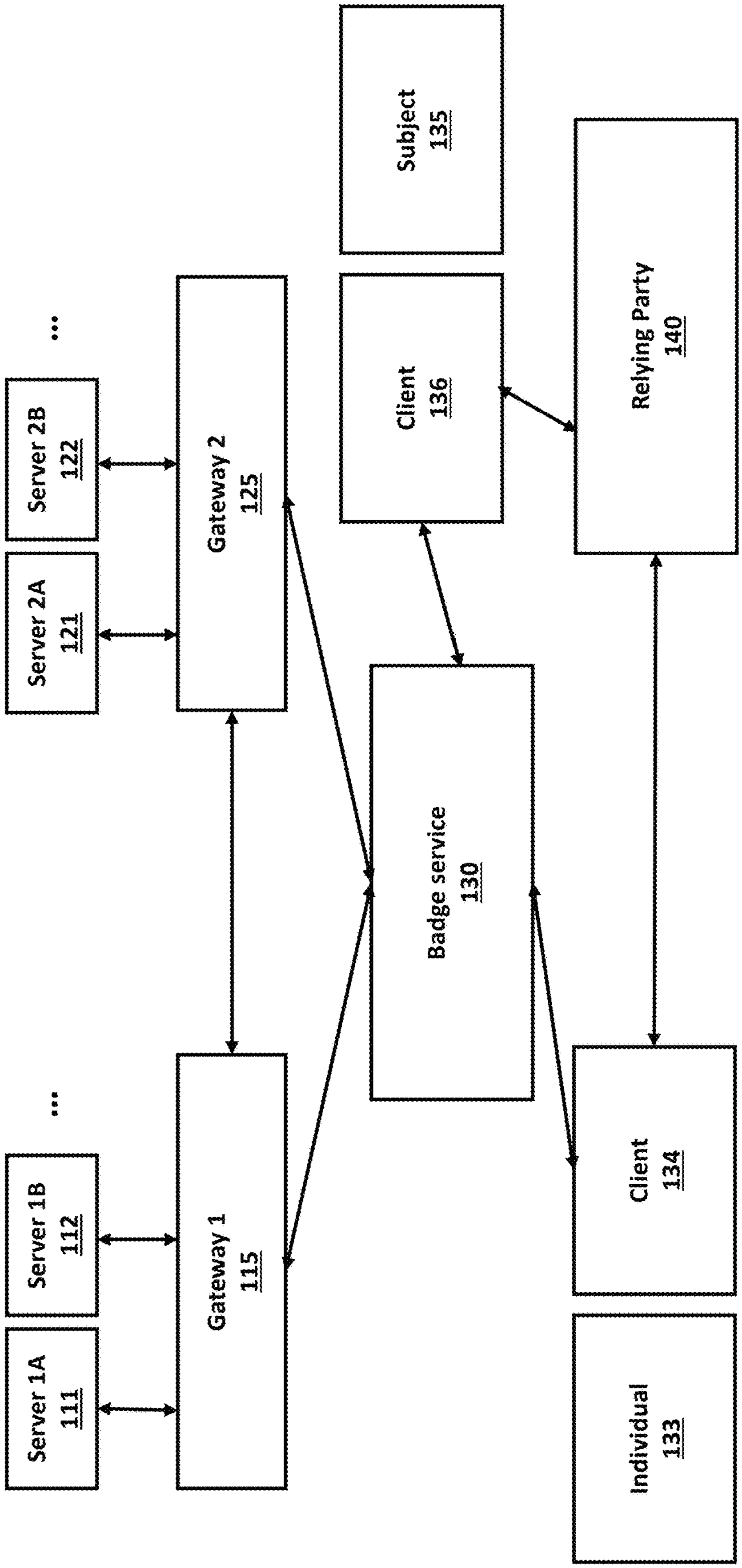
FIG. 1B is a block diagram illustrating another computer system for performing enrollment and authentication in accordance with an embodiment of the present invention.

FIG. 1B is a block diagram illustrating another computer system for performing enrollment and authentication in accordance with an embodiment of the present invention. Using the system of FIG. 1B, a relying party 140 authenticates users (individual 133, subject 135). The system of this exemplary embodiment includes:

The relying party (RP) 140, in one embodiment, is an enterprise, such as a pharmacy or bank, that wishes to authenticate its users in a privacy-preserving way, in compliance with HIPAA, GDPR, and/or other regulations, and in such a manner that they are not at risk of breach and reputational damage associated when user credentials are compromised, and in such a manner to offer a seamless user experience, such as in line with the enterprises' password-less, self-sovereign identity, digital identity transformation, non-custodial, decentralized, and compliance initiatives. The enterprise has a website, online marketplace, or digital payment gateway. In one embodiment, the website is written largely in Javascript and the RP has a MongoDB or other key-value store that stores the mapping from a username to the user's public key of a public-private signature key pair.

Client software (here written in Javascript) runs on a web browser, which in turn executes on the user's mobile phone. This software has access to the onboard camera to take pictures of the user's face. An instance of the software (client 134) interacts with the individual 133, who enrolls in the system, and with the other entities on behalf of the individual 133. An instance of the software (client 136) interacts with the subject 135, who purports to be the individual, and with the other entities on behalf of the subject 135. We sometimes term the individual's client 134, when it provides a biometric of the individual that is being enrolled for purposes of later authentication, a first "computing facility."

Badge service 130 encodes data from the user (individual 133 and subject 135). It also handles cryptographic operations with the derived biometric root private key. In embodiments, the service 130 is written in C++, and self-hosted by Badge. In one embodiment, each client 134, 136 performs the functions of the Badge service. In another embodiment, the Badge service 130 is hosted by a server. In another embodiment, each client 134, 136 is coupled to the Badge service 130. In another embodiment, the Badge service 130 is contained within the client 134, 136. Is another embodiment, the Badge service 130 is not contained within the client 134, 136. In one embodiment, the client 134, 136 is a front-end user interface and the Badge service 130 is the back-end. In one embodiment, the Badge service 130 performs the encoding and distributing of enrollment and authentication related information. In one embodiment, the client and service 134, 136, 130 are integrated with an existing client such as Windows Hello or Touch ID, and the servers 111, 112, 115, 121, 122, 125 are hosted in Azure, AWS, or other cloud platform.

The system of FIG. 1B includes a cluster of replicas of the server software corresponding to Server 1A 111, Server 1B, . . . . In embodiments, the server software is implemented in Go, and is deployed using Kubernetes in Google Cloud Platform and has a shared Postgres database that stores the users' encoded shares, which may be based on the biometrics and private keys. In addition to running a set of programs having APIs for communicating with the other servers, each server also runs a set of programs that have APIs for communicating with the clients. In one embodiment, these APIs include APIs for: enrolling the individual's secret shares of the encoded biometrics and the root private key, and performing authentication processes including these shares and secret shares of the subject's encoded biometrics.

The system of FIG. 1B also includes another cluster of replicas of server software corresponding to Server 2A 121, Server 2B 122, . . . . In embodiments, this server software is implemented in Python, and is deployed in Microsoft Azure in Central Europe. The cluster may include replicas of the Python version of server software, and has a shared MySql database that stores the users' encoded shares, which may be based on the biometrics and private keys. It provides APIs similar to those of the cluster of servers 1A 111, Server 1B, . . . , except written in Python on the server side.

Gateway 1 115 is a load-balancer (which may be written in Go) that routes traffic between different clients and different replicas in a way that minimizes the maximum load of a replica. In addition, the protocol, used in embodiments for loading balancing, requires the replica of server 1A 111 to find the exact replica of server 2A 121 that talks to the same client 134. The gateway 115 provides functionality to enable server 1A 111 to connect to the correct replica of server 2A 121. (In one embodiment, the mapping is dynamic depending on the load balancer. It could be, for example, determine dynamically that server 1A 111 is mapped to server 2G.)

Gateway 2 125 is a load-balancer that implements functionality similar to implemented by gateway 1 115, except written in Python (like cluster 2).

In the embodiment in FIG. 1B, a relying party 140 authenticates the subject user 135 using a series of enrollment processes are implemented as follows:

The individual 133 is asked to register or create an account by the Relying Party 140.

The individual 133 clicks an "enroll" option on the individual's client 134, which here functions as the first computing facility. The individual's client 134 requests the individual to take a face selfie picture, and the individual takes such a face selfie picture.

Next, the Badge service 130 and the individual's client 134 establish a secure, encrypted session.

The Badge service 130 securely communicates with the individual's client 134 using the secure, encrypted session. The Badge service 130 encodes data associated with the captured image of the individual's face so as to generate biometric data, which is fed through a deep learning neural net that outputs a vector.

The Badge service 130 generates shards using the vector.

The Badge service 130 causing distribution of the generated shards to the servers 111, 112, 121, 122. Within the secure, encrypted session, the individual's client 134 receives the root private key and derives an ECDSA (Elliptic Curve Digital Signature Algorithm) public and private key pair that is used for signing. In one embodiment, neither the ECDSA public or private key need to be stored because they can be re-derived when needed. In one embodiment, the individual's client 134 derives separate key pairs for use with different relying parties and applications. In one embodiment, some key pairs are used for data encryption. In one embodiment, the individual's client 134 sends the ECDSA public key to the Relying Party 140. The Relying Party 140 stores the public key, or uses a certificate authority or registration authority to store the public key in a public key database. In one embodiment, the Badge service 130 contains the certificate authority, registration authority, and/or public key database. In one embodiment, the Relying party 140 stores the public key and reports success to the individual's client 134. The individual's client 134 indicates successful enrollment to the individual.

In this embodiment, the shards may include one or more of the items on the following list of possible constituents. Any item on this list might have a plurality of occurrences.

1. Arithmetic shards of biometric data;
2. MAC codes for Arithmetic shards of biometric data;
3. Beaver triples;
4. MAC codes for Beaver triples;
5. Arithmetic shards of random value alpha;
6. MAC codes for arithmetic shards of alpha;
7. Arithmetic shards of MAC key (call the MAC key 'D'); and
8. Function secret shares of function In this embodiment, beaver triples are arithmetic shards of {x, y, x*y} for randomly chosen x and y. In some embodiments, encoding includes encoding the above into the generated shards.

In one embodiment, the MAC code is thought of as being a part of the share itself. "Authenticated arithmetic share" is the tuple of a share and it's MAC code. For example, for a shard of 'a', the corresponding MAC code is a shard of (a*D), where 'D' is the MAC key). In this embodiment, the shards may include one or more of:

1. Authenticated arithmetic shards of biometric data;
2. Authenticated Beaver triples;
3. Authenticated arithmetic shards of random value alpha;
4. Arithmetic shards of MAC key; and
5. Function secret shares of a function In this embodiment of the system wherein a relying party 140 authenticates a subject 135 purporting to be the user 133, authentication processes are implemented as follows:

The subject 135 tries to login to the relying party's application, requesting the login on the subject's client 136, in this case acting as a second computing facility for purposes of authentication.

The subject's client 136 (e.g., running on the subject's device) sends the request for user authentication to the relying party 140, which is using what we call a third computing facility.

The relying party 140 returns a challenge to the subject's client 136, which includes a request to sign a message with the ECDSA private key.

The subject's client 136 requests a face selfie of the subject 135.

The subject 135 takes such a selfie of her face.

The subject's client 136 and Badge service 130 establish a secure, encrypted communications channel.

The Badge service 130 encodes and generates shards.

The Badge service 130 distributes a subset of shards to the plurality of servers 111, 112, 121, 122.

A subset of servers 111, 112, 121, 122 perform a data exchange process.

A subset of the subset of array of servers 111, 112, 121, 122 send information to the Badge service 130.

The Badge service 130 uses the information to re-derive the root private key.

The Badge service 130 communicates with the subject's client 136 on the secure, encrypted channel in a manner to enable the subject's client 136 to re-derive the ECDSA private key.

The subject's client 136 signs a message with the ECDSA private key.

The subject's client 136 transmits the signed message to the relying party 140.

The relying party 140 verifies the signature using the ECDSA public key (which was previously stored for access by the relying party 140).

If the signature is valid, the relying party 140 successfully authenticates the subject 135 as the individual 133. In one embodiment, the relying party 140 grants access to the subject's client 136 to access an application.

The result of the authentication is reported to the subject 135.

The subject 135, once authenticated as the individual 133, accesses the relying party's application. In one embodiment, the subject 135 views her account balance. In another embodiment, the subject 135 views the results of her medical tests. In another embodiment, the subject 135 unencrypts messages, a payment wallet, or other data. In another embodiment, the subject 135 signs a document or other data using a digital signature. In one embodiment, the subject 135 signs a transaction e.g., to be accepted and recorded by a distributed ledger, block chain, or transaction processing stack.

In another embodiment, encoding includes processing biometric data for generation of a biometric template. In one embodiment, the deep learning neural net is provided by another entity, such as a biometrics vendor. In another embodiment, the biometric data is processed using a feature extraction and/or alignment algorithm that outputs a biometric template. In another embodiment, face biometric data is fed through a face-trained neural net that outputs a first vector, and voice biometric data is fed through a voice-trained neural net that outputs a second vector, and the two vectors are combined e.g., using a tensor product, for generation of a biometric template.

Some embodiments of the present invention can uniquely leverage multiple biometric inputs. For example, if each biometric input is fed through a machine-learning model and has an output in metric space, these embodiments can generate shards from these biometric input. In embodiments, the Badge service 130 uses machine learning to generate vectors and then uses the generated vectors as inputs of the authentication process. The use of machine learning applies to multiple biometric and non-biometric inputs, and also applies to multiple vectors. In one embodiment, these techniques are leveraged during generating shards from the digital electronic signal.

In one embodiment, the digital electronic signal is a video that includes facial images and a voice of a person. The facial image will go through its own neural net and the voice will go through its own neural net. Each neural net will produce a vector at the time of enrollment (namely, what we call an "enrollment vector") and, again, at the time of authentication (what we call an "authentication vector"), such as a face vector and a voice vector. These two vectors are merged (with or without additional information) to create an input vector. For example, the face vector and voice vector may be combined with a pin code, to create a merged vector. As a further example, the additional information may include a set of metadata that indicates what type of biometric input the vector is derived from. In one embodiment, the computing facility takes the input vector and uses it to generate shards. In this way, shards can be generated based on vectors of multiple biometrics. In an alternative embodiment, there are two digital electronic signals, one for face and one for voice. In one embodiment, generating includes obtaining an output in metric space that was created using a neural net whose input includes a component of the digital electronic signal. The output in metric space can include a vector. The biometric data can be represented as one or more vectors in a metric space. In one embodiment, the vectors are generated using a neural net or deep learning model. In accordance with various embodiments of the present invention, processes, configured to preserve privacy of biometric data, for authentication involve the calculation of distances (between authentication and enrollment vectors) in metric space and comparing the calculated distances against a threshold.

The above described neural nets may have a given performance in terms of False Accept Rate (FAR) and False Reject Rate (FRR). Some embodiments of the present invention provide a way to perform privacy preserving authentication without degrading the FAR and FRR performance at a given threshold.

In this way, these embodiments provide a uniform approach to using arbitrary modalities of biometrics—the above deep learning approach can be used with face authentication, voice authentication, behavioral authentication, etc., as well as with more traditional biometric modalities such as fingerprint, iris, retina, palm, etc. The architecture in some embodiments enables uniform support of biometric modalities that have not yet been invented. Such architecture also enables uniform support of the above in combination with factors such pins, tokens, patterns, passwords, etc.

In various patterns of authentication described in this application:

- a person can use one or more modalities (such as face, voice, fingerprint, periocular face, pin, password, SSID, token, etc.) to enroll;
- and then can authenticate with a subset of these modalities;
- and can enroll additional modalities over time;
- and (as explained in the following paragraph) some of these modalities can be compromised without compromising the system.

For example, the fingerprint biometric might be compromise—in an event unrelated to the technology described herein—when fingerprint templates stored in a database elsewhere are compromised, but this compromise of conventional technology does not result in compromising a system in accordance with an embodiment of the present invention. In another example, if an underlying private key is compromised, this compromised key can be revoked in accordance with embodiments of the present invention. As another example, when it is determined that a password should not be used anymore, the password can be eliminated as a valid modality for authentication. In some embodiments, this determination is made by the user, and in other embodiments the determination may be made by an organization such as a bank, government agency, or automatically when a set of conditions has been established to justify the determination.

In some embodiments, the nature of a proposed use of information governs selection of a tier of security risk associated with such use and consequently the authentication factors required to implement such use. For example, herein, under one scenario only the individual's face is required to log in to see the individual's bank balance, but then, in another scenario, to perform a transaction, which involves a higher tier of security risk, the individual would be required to pass requirements of face recognition as well as voice recognition. In yet another scenario, for example, involving a change of an individual's address, in addition to biometric requirements, there may be imposed a requirement for revealing a secret, such as a user's PIN. Other examples includes an organization choosing which input factors or combinations are required based on user convenience relative to the application or transaction for which the user desires to access.

The causing distribution of shards in the embodiment of FIG. 1B is based on a combination of one or more conditions including: online status, availability, breach condition, capacity, location, privilege status, decentralization, load balancing, history, performance, a scheduling algorithm, or security group. For example, if multiple servers 111, 112 in a cluster have been compromised, other servers in that cluster may not receive the distributions. For example, the gateway 115 or gateway 125 could pick which servers in the cluster to use to achieve load balancing. For example, the Badge service 130 or the client 134, 136 could indicate a preference for which servers receive the distribution. For example, multiple servers may receive one or more shards that another server also receives. In another example, no server receives the same shard that another server receives.

Such "causing distribution" does not by itself require a particular pattern of distribution, and a range of patterns of distribution can be employed depending on context of the relevant computer processes. Under one pattern of distribution all servers get the same information, and that information may or may not be public. Under one further scenario, the information might be "blinded," as that term has been used herein. In another pattern, for example, different servers get different information, which may be overlapping, or not, and which, generally is not public information. A variety of methods of distribution may be employed. In one scenario, for example, the distribution method may involve providing further information to a server to allow it to interpret information previously delivered to it.

In one embodiment, within a secure encrypted session between the client 134, 136 and the Badge service 130, the client 134, 136 receives the root private key and derives an RSA public and private key pair that is used for signing. In another embodiment, the Badge service 130 derives the key pairs and posts the public keys to a public key directory, which in some embodiments is accessed by certain relying parties and applications. In one embodiment, neither the RSA public or private key need to be stored because they can be re-derived when needed. In one embodiment, the client 134, 136 derives separate key pairs for use with different relying parties and applications. In one embodiment, some key pairs are used for data encryption. In this way, the human is the root of trust (instead of a hardware or physical root of trust, or a software root of trust, that could be lost or compromised). The human root of trust can, on-demand, re-derive key pairs to authenticate to, sign, encrypt, or provide other functions with relying parties, services, and applications.

In some embodiments, the system of FIG. 1B includes more than two server clusters. In this embodiment, the system architecture in FIG. 1B is changed such that the Badge service 130 is connected to the additional server clusters. In one embodiment, the servers or server clusters have a point-to-point connection with every other server or cluster. In one embodiment, the servers will have a series of broadcasts among themselves to carry out a MPC protocol.

1.1 Data Encoding

In some embodiments, user U has a biometric template T that can be represented by a set of features and that there exists a subset of points P S T that corresponds to the entropy of the template. In one embodiment, each feature is an element of the same universe, and the universe must be finite and have a total ordering. In some embodiments, this total ordering must be known to both U and U', and may be constant or vary depending on one or more authentication factors, which could include, for example, a pin, password, characteristic of an ear canal, biometric data. To state the conditions of these embodiments differently, there exists a subset of points that represents the randomness of the biometric data. Let us call the subset of points P, the entropic points. In one embodiment, an encoding algorithm is used to encode T to an encoded template $E_T$ and an algorithm $f$ that performs authentication given the encoded template $E_T$ and the entropic points $P^I$ of a second template $T^I$, where $T^I$ is generated by user $U^I$. That is, $f(E_T, P^I)=1$ if the user $U^I$ is the same as U, and $f(E_T, P^I)=0$ otherwise. Note that this means the function is symmetric, in that $f(E_T I, P)=1$ if and only if U is same as $U^I$ as well.

An example of such a biometric template and encoding scheme is representing a two-dimensional face or fingerprint template as a list of (x, y) coordinates of the features associated with the template. The encoding and the entropic points are precisely the list of (x, y) coordinates, and the corresponding $f$ would check if each of a large fraction of entropic points of the second template has a corresponding point in the first template that is within a small Euclidean distance. The choices of encoding and $f$ can be made such that they improve performance.

1.2 Communications for Enrollment and Authentication

In some embodiments, enrollment (also referred to as registration) is carried out between an honest individual and a plurality of servers. The purpose of enrollment is to enable the individual to authenticate herself at a later point. After enrollment of the individual, authentication is carried out between a subject, who may or may not be the same as the enrolled individual, and the plurality of servers.

Figure 1C:
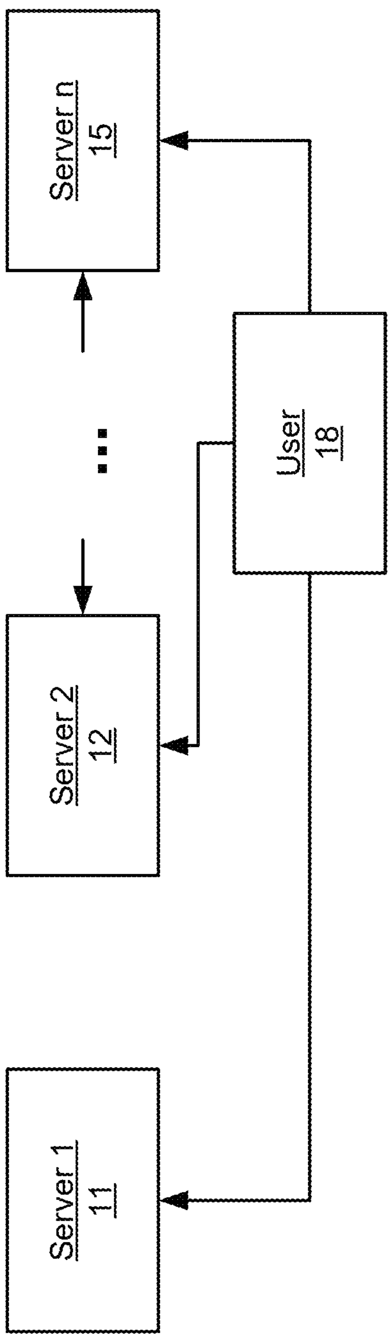
FIGS. 1C and 1D are block diagrams illustrating communication paths for enrollment and authentication respectively in a computer system using n servers in accordance with an embodiment of the present invention.
Figure 1D:
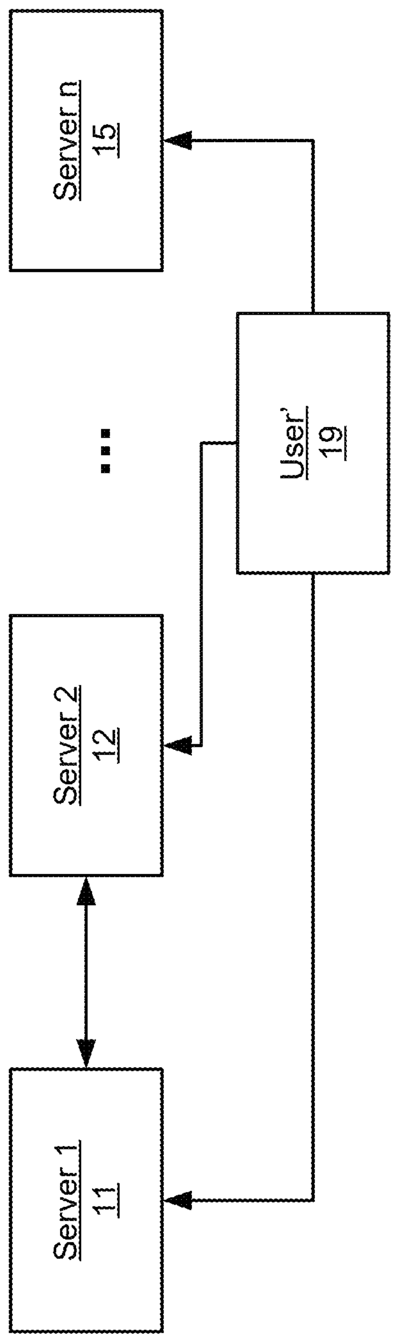

FIGS. 1C and 1D are block diagrams illustrating communication paths for enrollment and authentication respectively in a computer system using n servers in accordance with an embodiment of the present invention. In enrollment in FIG. 1C, individual, User (U) 18, enrolls with the system by sending her sharded data to each server 11, 12, . . . , 15. In authentication in FIG. 1D, subject, User' (U') 19, attempts to authenticate herself as the User (U) 18 by communicating with the servers 11, 12, . . . , 15. In the embodiment of FIGS. 1C and 1D, the servers 11, 12, . . . , 15 must also communicate with each other.

In one embodiment, we assume that at least one of the servers 11, 12, . . . , 15 is honest, meaning that it will follow the protocol for authentication in this embodiment correctly, and it will not reveal any of its private values. If at least one server is honest, the following goals can be achieved:

Correctness. If the subject is individual and the servers and the subject follow the protocol without deviating from the protocol, then the servers are convinced that the subject is the individual.

Soundness. If the subject is not the individual and at least one server is honest, then the honest server will not be convinced that the subject is the individual, and authentication will not succeed.

Zero-knowledge. For example, if at least one server is honest, then no server should learn the biometric data of the individual or subject. Furthermore, even if the subject is malicious in this scenario, neither the subject nor any server will learn anything about the biometric template of the individual during the authentication protocol.

Zero-knowledge is related to privacy preservation. In some embodiments, even if all but one of the servers is actively malicious:

- the output value is not revealed to the computing facility or the plurality of servers;
- neither the individual's biometric data nor the subject's biometric data (nor the digital electronic signal that characterizes a biometric of the subject) is revealed to the servers; and
- the servers do not obtain intermediate values of the multiparty computation.

2.3 Brief Background of MPC

There are many different forms of multiparty computation (MPC), including methods that perform computation on "sharded" values. A "sharded" value is a value x that is shared across two or more servers. The shards alone reveal nothing about x, but only reveal x when combined. For example, x can be arithmetically sharded into $[x]_1$, $[x]_2$ as:

$$[x]_1 = r \mod p$$

$$[x]_2 = x - r \mod p$$

where r is a random integer, and p is a large prime number. One can see that $x=[x]_1+[x]_2$, but $[x]_1$ and $[x]_2$ are each random (because r is random).

We describe here method of sharding data (arithmetic sharding). There are also multiple other methods of sharding data. A process to shard secrets (including e.g., Shamir shards—polynomial interpolants, bitwise XOR shards, linear sharding, etc.) may be used as well.

MPC allows us to perform complex operations on these sharded values including addition, multiplication, and integer comparison. These operations occur entirely on sharded values to generate shards of the result of the computation. The servers then reveal these output shards to learn the result of the computation together. In this way, the set of servers learns only the output of the computation and not the input or any intermediate values.

While MPC is general and powerful, it is also expensive and therefore impractical for many applications. For example, in the above sharded protocol, certain operations are more expensive than others. Specifically, each multiplication and comparison operation is expensive. The operations typically require a separate offline "setup" phase involving large amounts of computation and communication.

This setup phase is so expensive (both in terms of computation and communication) that it renders most MPC impractical for most applications. Even the online phase (occurring after the setup phase) can be impractical, as each multiplication and comparison operation requires information to be exchanged among all of the participating servers. This process can be costly in terms of time (on the order of 200 ms-500 ms), owing to network latency among other factors.

Finally, many approaches that deal with these shortcomings sacrifice security. That is, many protocols protect only the user's data if all servers obey the protocol honestly. This security model is in general too weak for practical applications.

The sharding described above shards a value. Function secret shares are a mechanism to shard a function instead of a value. Functionally, they work in a similar fashion to the sharding described above. The key difference is that instead of sharding a value (x) and jointly computing a known, shared function (f), you are sharding a function (f) and computing on a known, shared value (x).

2.0 Secure Subset Selection

In accordance with embodiments of the present invention, we develop and use a sharded subset protocol. A s' [illegible] two phases: setup (corresponding to what we have sometimes called "enrollment") and select (corresponding to at least part of what we have sometimes called "authentication"). The setup phase is carried out between servers $S_i$, at least one of which is honest, and a trusted third party U. The select phase is carried out between the same servers, and another third party $U'$ who may or may not be trusted. The high level goal of a sharded subset is to allow the trusted party U during the setup phase to "commit" some messages $$M = \{msg_i\}_{i=1}^{n}$$

to the servers. At a later point, in authentication, the protocol should allow $U'$ to select a subset of the messages of a fixed size $f$ without learning the content of the messages, and a given server $S_a$ should then learn the content of the subset $\{msg_j: j \in \Phi \wedge \Phi \subset [n] \wedge |\Phi| = f\}$ without learning the indices of the chosen messages $\Phi$. That is, at the end of the protocol, one of the servers will have access to a subset of the plaintext messages U committed, but which particular messages were chosen to form this subset remains hidden. For sake of formally specifying the protocol, let $M'=\{msg'_j\}$ be the set of messages the given server $S_a$ possesses at the end of the protocol, and that $S_a$ outputs 1 if $M' \subset M$, or it aborts otherwise. As described herein, in connection with authentication more generally, there are three goals for a sharded subset, correctness, soundness, and zero knowledge.

Correctness: If all participants are honest, then the protocol will not abort and the given server $S_a$ outputs 1 with probability 1. Moreover, if $S_a$ and $U^I$ are both honest and the protocol does not abort, then $M^I$ is exactly chosen using Φ.

Soundness: If $S_a$ is honest and if $M' \not\subset M$, then the protocol aborts with overwhelming probability, regardless of how the other servers and $U^I$ cheat.

Zero-knowledge: No server should learn anything about Φ as long as one server remains honest. Moreover, $\{S_i\}_{i \neq a}$ and $U^I$ should learn nothing about the underlying plaintext messages, as long as the given server $S_a$ is honest.

3.0 Enrollment and Authentication Protocols

We now describe how individual U may store its biometric template on the servers securely, and subject $U^I$ can authenticate itself at a later point. Portions of this description expand on concepts disclosed in PCT publication WO 2017/083732, filed on Nov. 11, 2016, which is hereby incorporated herein by reference in its entirety.

Figure 4:
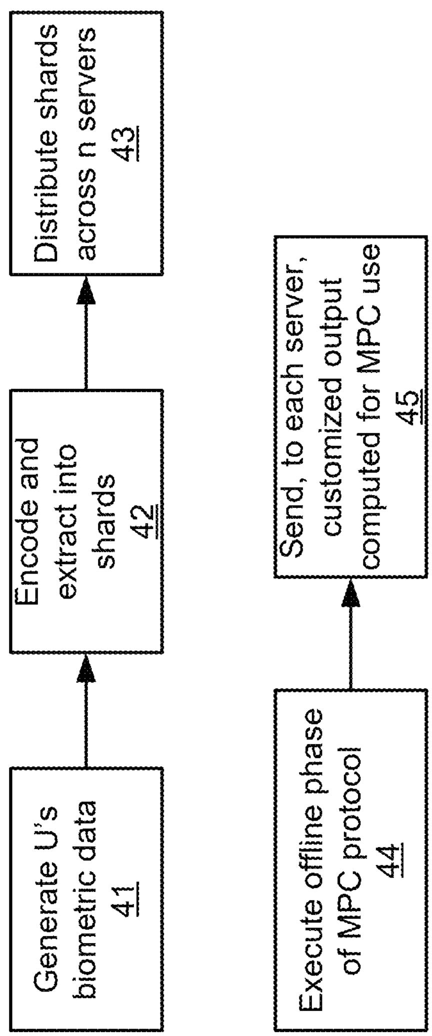
FIG. 4 is a diagram of logical flow of an enrollment process, in accordance with an embodiment of the present invention.

FIG. 4 is a diagram of logical flow of an enrollment process, in accordance with an embodiment of the present invention. During enrollment, in process 41, a first biometric computer system causes generation of biometric data for an individual U, and, in process 42, encodes and extracts into shards the generated biometric data. (The encoded biometric data corresponds to template $E_T$, which is compliant with section 1.1.) The encoded biometric data appears in n shards, where n is the number of servers. In process 43, the first biometric computer system distributes the n shards across the n servers. In a further related embodiment, additional (optional) processes are carried out by the first biometric computer system. In particular, in process 44, the first biometric computer system executes an offline phase of the MPC protocol that later is used in authentication. In process 45, the first biometric computer system then sends, to each server, a customized output that has been computed for use in the MPC. (It will be recalled, from section 1.1, that, for authentication, the MPC uses the algorithm that corresponds to f.)

Figure 6:
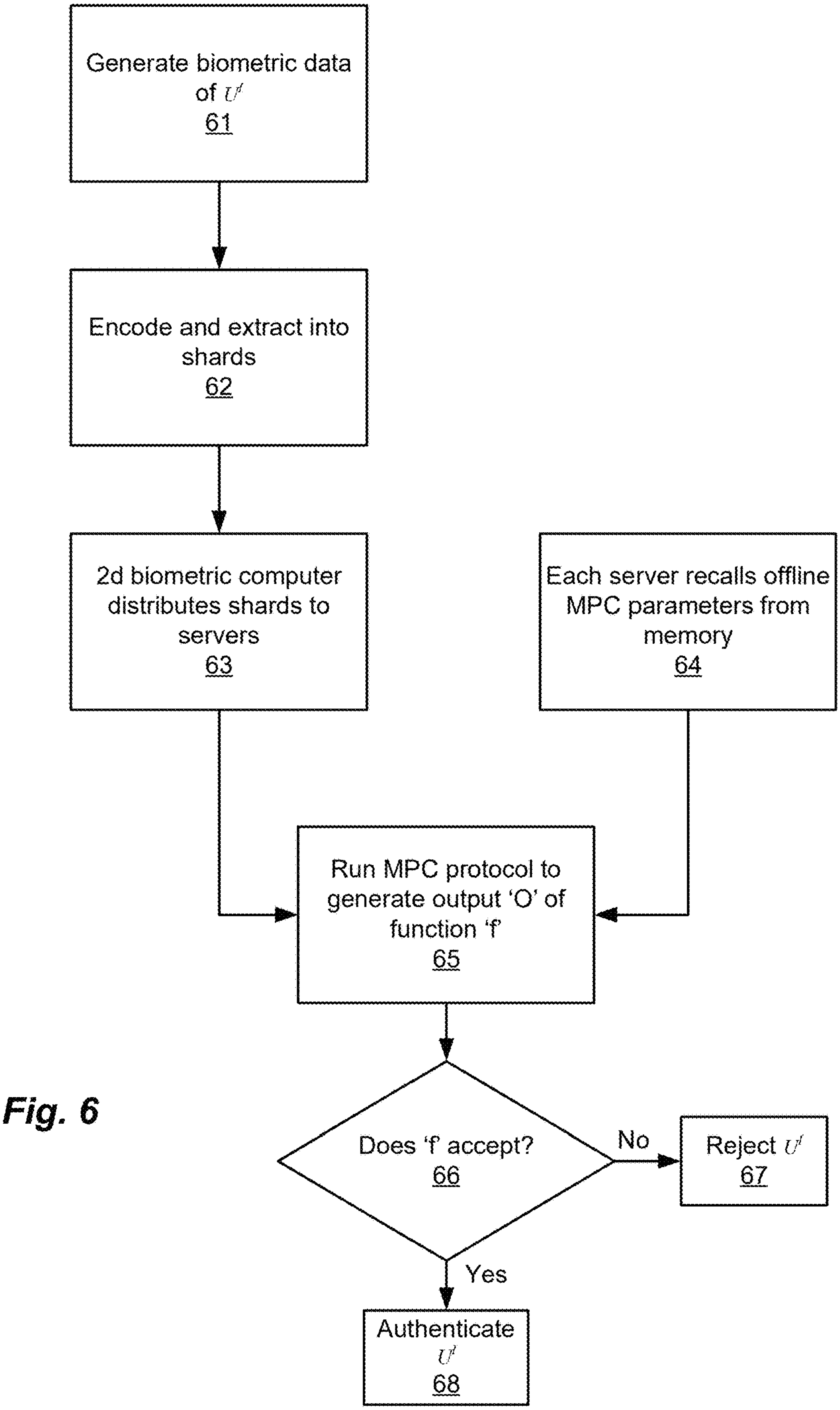
FIG. 6 is a diagram of logical flow of an authentication process, in accordance with another related embodiment of the present invention.

FIG. 6 is a diagram of logical flow of an authentication process, in accordance with another related embodiment of the present invention. During authentication, in process 61, a second biometric computer system generates biometric data of the subject. Then, in process 62, the second biometric computer system encodes and extracts into shards the biometric data of the subject. The biometric data thus encoded constitute the entropic points $P^I$ (first mentioned in section 1.1 above). In process 63, the second biometric computer distributes the n shards across the n servers. In process 64, each of the servers recalls from memory the MPC parameters that were precomputed from U in the offline phase (processes 44 and 45 in FIG. 4) of MPC. In process 65, the servers compute $f(E_T, P^I)$ without learning anything about $E_T$ and $P^1$. In one embodiment, function 'f' is a biometric match function. In one embodiment, this computation results in shards of an output value O. In one embodiment, the shards of O are returned to the subject, who then reconstructs these shards to recover O. In one embodiment, if the final output O is 1, then the subject is authenticated as the individual. Otherwise, the subject is not authenticated as the individual.

In another embodiment, the servers may recover O without returning any shards to the user. In one embodiment, if the final output O is 1, then the subject is authenticated as the individual. Otherwise, the subject is not authenticated as the individual.

In another embodiment, O may be chosen arbitrarily at enrollment to be any value. In one embodiment, O may be chosen to be a secret key (or shard of a secret key, if more than one factor is being used).

In another embodiment, the second biometric computer causes the servers to compute a MAC code for the shards of the subject. These MAC codes are used over the course of determining the servers computing $f(E_T, P^I)$. MAC codes are returned along with the shards of O. The subject then checks this MAC code prior to reconstructing O to determine whether the servers computed $f(E_T, P^I)$ correctly and did not learn anything about $P^I$.

In another embodiment, the servers use protocols including SPDZ and/or function secret shares to compute $f(E_T, P^I)$.

In another embodiment, a second biometric computer causes biometric data of a subject purporting to be the individual to be generated and shards the biometric data of the subject and distributing, across the plurality of servers, the shards of the subject. The distribution of the shards causes the servers to compute a MAC code for the shards of the subject and each of the servers to execute a multiparty computation algorithm to determine a blinded value match score for the sharded biometric data of the subject in relation to the corresponding sharded data of the individual. Each of the servers use the blinded match score to compute a corresponding function share, and to return, to the second biometric computer, the computed function share along with values for the MAC codes previously computed. The second biometric computer uses the function share data to determine whether there has been a determination of a match and to evaluate the MAC codes to confirm the authenticity of the function share data.

In process 66, each of the servers is programmed to accept or reject individually. In one embodiment, the programming is done in such a manner that a server does not learn whether it accepted or rejected. In addition, it does not learn whether any of the other servers accepted or rejected. In one embodiment, it is not possible to determine from a given server's shard of the output value whether the output value indicates that the subject is authenticated as the individual or not." An authentication process 68 is successful if and only if a sufficiently large subset of servers accept in process 66.

The following are two examples where, in some embodiments, not all servers accept in process 66.

In a first example not all the servers accept based on redundancy. In one embodiment, more than one server received the same shards during enrollment/authentication. In that case, more than one server will produce the same output shard. In one embodiment, authentication requires only one instance of each output shard. If two servers who received the same shards produce different output shards (for example because one server is malicious or malfunctioned), and a subset of the output shards result in successful authentication, then the subject is successfully authenticated as the individual. In one embodiment, if it is possible to recover an output that confirms authentication, then the subject is successfully authenticated as the individual.

Alternatively, in another embodiment: Server 1 received enrollment shard 1 and authentication shard 1. Server 2 received enrollment shard 1 and authentication shard 2. Server 3 received enrollment shard 2 and authentication shard 1. Server 4 received enrollment shard 2 and authentication shard 2. It is possible to authenticate using only servers 1 and 4. Or it is possible to authenticate using only servers 2 and 3. If either servers 1 and 4 or servers 2 and 3 confirm authentication, the subject is authenticated as the individual.)

In a second example, certain methods of sharding, such as Shamir sharding, result in a situation where only a certain number of shards are needed to recreate the secret (in this case the secret is the output value)—n out of m shards is sufficient.

The exemplary methods described in examples 1 and 2 above may be selected for reasons including that sometimes servers go down, become unavailable, malfunction, go offline, or servers can be malicious.

In one embodiment, every server coupled to a given gateway receives the same shards. In such embodiment, during a given authentication attempt, each gateway selects one server coupled to it to participate in the data exchange process (such that one server from each gateway is participating). In the event of a failed authentication, authentication may be retried, either depending on certain conditions or automatically. During this retry, each gateway may choose (such as based on an internal scheduling or load balancing algorithm) to assign a different server than was used in the prior attempt. In this way, the array of servers participating in the first authentication attempt may be a different subset of servers than participating in the second authentication attempt. This mitigates the potential for single points of failure in the array of servers or the subset of servers.

Now we describe another embodiment in connection with FIG. 4. FIG. 4 is a diagram of logical flow of an enrollment process, in accordance with an embodiment of the present invention. During enrollment, in process 41, a first biometric computer system causes generation of biometric data for an individual U, and, in process 42, encodes and extracts into shards the generated biometric data. (The encoded biometric data corresponds to template $E_T$, which is compliant with § 1.1.) The encoded biometric data appears in n shards, where n is the number of servers. In process 43, the first biometric computer system distributes the n shards across the n servers. In a further related embodiment, additional (optional) processes are carried out by the first biometric computer system. In particular, in process 44, the first biometric computer system executes an offline phase of the MPC protocol that later is used in authentication. In process 45, the first biometric computer system then sends, to each server, a customized output that has been computed for use in the MPC. (It will be recalled, from section 1.1, that, for authentication, the MPC uses the algorithm that corresponds to $f$.)

Figure 2:
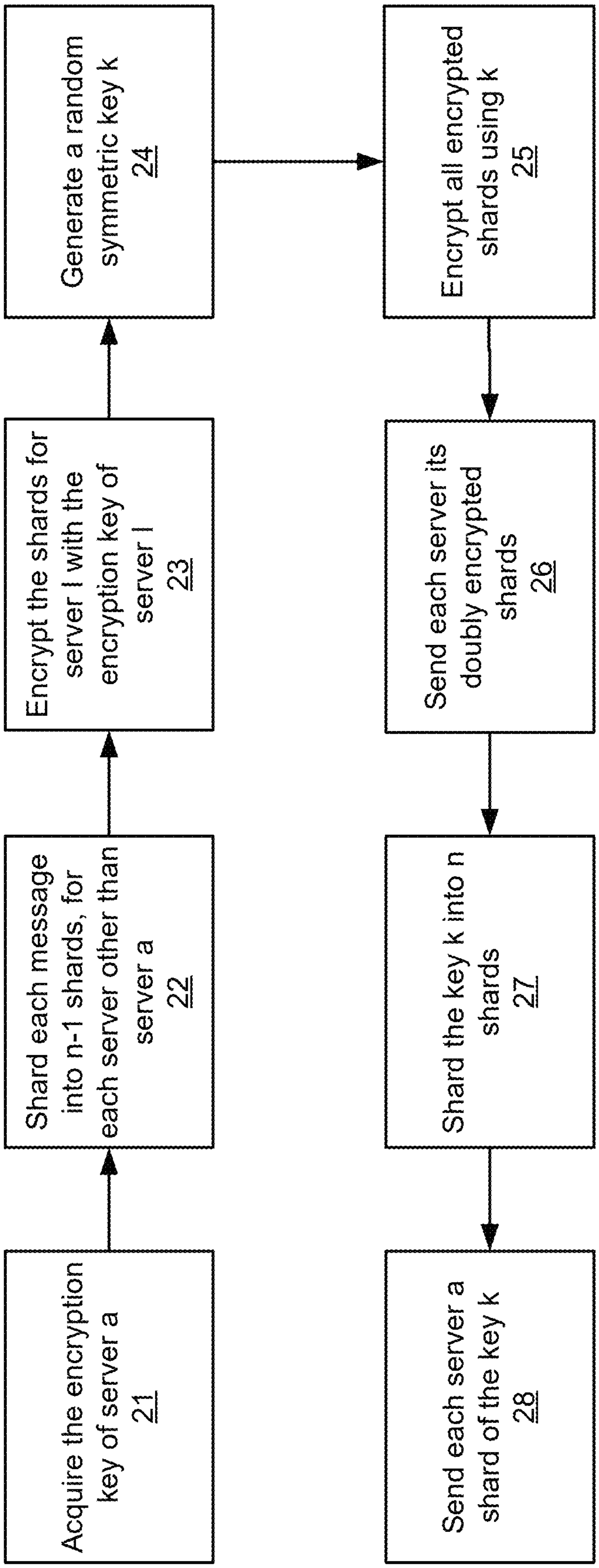
FIG. 2 is a diagram of logical flow illustrating how encryption of shards distributed to the servers in the course of enrollment is achieved by the first biometric computer system in accordance one embodiment of the present invention.

In some embodiments of the present invention, the shards distributed to the servers in the course of enrollment (as just described in connection with FIG. 4) are encrypted. FIG. 2 is a diagram of logical flow illustrating how such encryption is achieved by the first biometric computer system in accordance one embodiment of the present invention. In process 21, the first biometric computer acquires the encryption key of server a. In process 22, the first biometric computer system shards each message into n-1 shards, for each server other than server a. In process 23, the first biometric computer system encrypts the shards for each server i (other than server a) using the encryption key of server i (which the first biometric computer obtains from server i). There are now n-1 encrypted shards. Next, in process 24, the first biometric computer system generates a random symmetric key k. In process 25, the first biometric computer system further encrypts the n-1 encrypted shards using the symmetric key k. In process 26, the first biometric computer system sends each server i of the n-1 servers its corresponding doubly encrypted shard. (Remember that each shard for server i is initially encrypted with a key obtained from server i.) In process 27, the key k is itself sharded into n shards, and, in process 28, the first biometric computer system sends each server a shard of key k.

Figure 3:
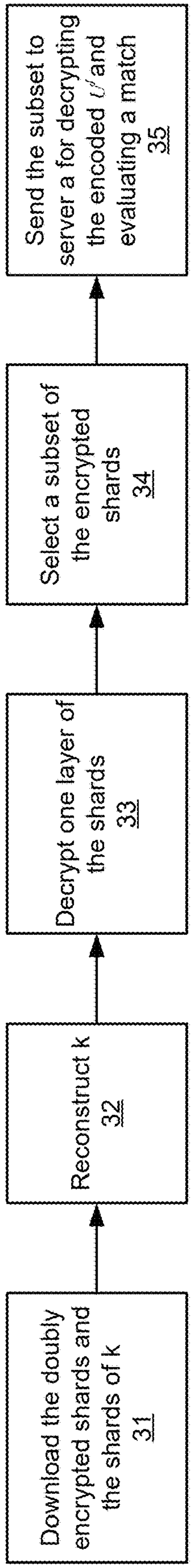
FIG. 3 is a diagram of logical flow in authentication under circumstances in which the shards have been encrypted in accordance with the processes described in connection with FIG. 2.

FIG. 3 is a diagram of logical flow in authentication under circumstances in which the shards have been encrypted in accordance with the processes just described in connection with FIG. 2. In process 31, the second biometric computer system downloads, from the servers, the doubly encrypted shards and the shards of k that were distributed by the first biometric computer system in processes 26 and 28 of FIG. 2. In process 32, the second biometric computer system reconstructs k. In process 33, the second biometric computer system uses the reconstructed k to decrypt one layer of the shards. However the shards at each server i (other than server a) remain encrypted by the encryption key of server i. In process 34, the second biometric computer system selects a subset of these encrypted shards and, in process 35, sends the subset to server a for decryption so as to recover from server a the encoding of biometric $U^I$ and cause evaluating by server a the existence of a match.

Figure 5:
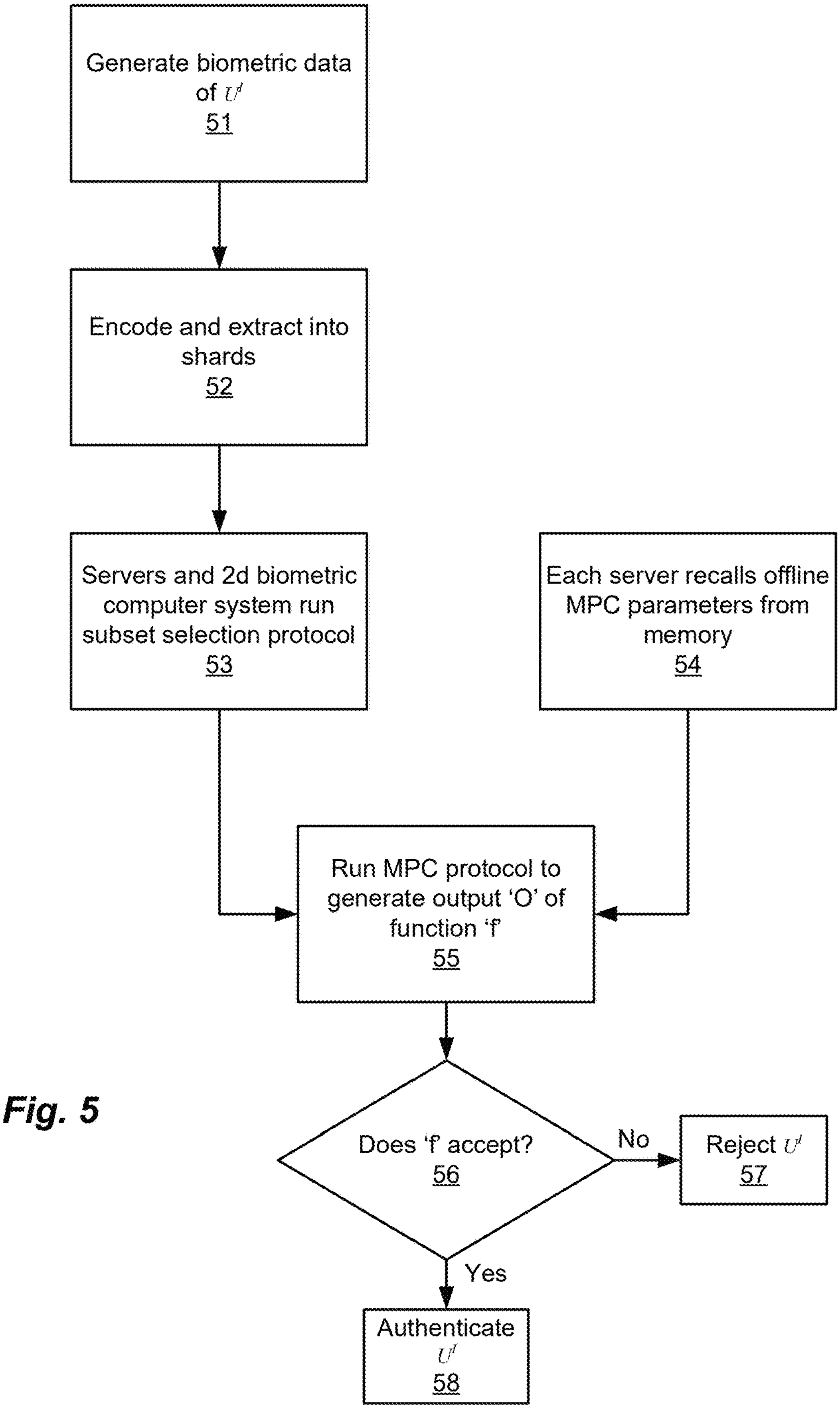
FIG. 5 is a diagram of logical flow of an authentication process, in accordance with a related embodiment of the present invention.

FIG. 5 is a diagram of logical flow of an authentication process, in accordance with a related embodiment of the present invention. During authentication, in process 51, a second biometric computer system generates biometric data of user $U^I$. Then, in process 52, the second biometric computer system encodes and extracts into shards the biometric data of user $U^I$. The biometric data thus encoded constitute the entropic points $P^I$ (first mentioned in section 1.1 above). In process 53 the servers and the second biometric computer system execute the select step of the subset protocol (described above in connection with FIG. 3) to select a subset of the encrypted shards that corresponds to $P^I$. At this point, each server then possesses shares of points of $P^I$, and shares of $E_T$. In process 54, each of the servers recalls, from memory, the MPC parameters that were precomputed from U in the offline phase (processes 44 and 45 in FIG. 4) of MPC. In process 55, the servers compute $f(E_T, P^I)$ jointly with the second biometric computer system without learning anything about $E_T$ and $P^I$. In one embodiment, function 'f' is a biometric match function. If the final output is 1, then $U^I=U$. Otherwise, $U^I \neq U$. In process 56, each of the servers is programmed to accept or reject individually. An authentication in process 58 is successful if and only if all servers accept in process 56. Otherwise, authentication of the subject $U^I$ is rejected in process 57.

This authentication process has potential for usage in multiple areas. One skilled in the art will be able to recognize that this technology can be used for many applications, including authentication. Applicable industries include financial & banking, government & defense, healthcare & medical, retail, consumer authentication, enterprise, identity, and many others.

Moreover, although the above embodiment reveals a yes/no result for authentication, other embodiments include key derivation by e.g., sharding the key across the plurality of servers, and then (upon successful authentication), each server sends its shard to $U^I$. Therefore, upon successful authentication, $U^I$ can reconstruct a secret key to be used for further cryptographic operations.

Additional examples of authentication uses of some embodiments of the present invention include: Authenticating a user to a server (e.g., deriving SSH keys, client SSL certificates and keys, Enterprise 802.11 certificates and keys, OAUTH tokens, one-time-passwords, etc.).

Note that these can also be chained (e.g., OAUTH tokens can be used to obtain subsequent certificates/keys).

Additionally, some embodiments of the present invention may be used for authentication to the authentication servers themselves. For example, an authenticated user can update his/her authentication data, user details, authorization policies, etc. with each server.

4.0 Example Encoding Scheme and Authentication Algorithm

Now, we can put the above pieces together in an example embodiment that provides fingerprint authentication and achieves the security benefits described in Section 2. In this example embodiment, we will use fingerprint biometric data that will be encoded as described below and leverage the SPDZ multiparty computation protocol for the comparison phase. This example embodiment is discussed below.

4.1 Fingerprint Biometrics and Representations

Fingerprints are a common biometric modality that are widely deployed commercially today. Many fingerprint recognition algorithms use extracted minutiae (locations where fingerprint ridges split or end) locations and angles to represent a fingerprint. Comparison of two fingerprints then requires determining how close sets of minutiae are to each other. One method to do this matching is with the "Minutia Cylinder Code" (MCC). This method maps the space of minutia around a point into a three-dimensional quantized data structure (x-coordinate, y-coordinate, θ-angle).

The presence of a minutia at a specific location with a specific angle assigns the associated point in the data structure to one. Absence corresponds to zero. To compare to fingerprints, one takes the dot product of the two minutia cylinder codes and determines if that dot product is greater than a threshold T:

$$E_T \cdot E_T I > T$$

where $E_T$ is the MCC encoding of template T, and $E_T I$ is the MCC encoding of template $T'$.

If we choose an entropic subset $P' \subset T'$ (we sometimes refer to an "entropic subset" herein as a "confident subset") as the set of minutia with highest confidence and highest distinguishing power (cf. Section 2) then we can similarly encode $P'$ as a MCC, and represent the matching function $f$ as the same dot product.

If we represent the MCC from $P'$ entirely as 1's and 0's, then we can see that a dot product of $E_T$ with the encoding of $P'$ simply as the sum of a subset of $E_T$. The subset operation is executed using the protocol in Section 3 and the sum/threshold operation is performed using MPC (described below).

Before continuing, note that the above MCC representation can be enhanced by using one or more of the following methods.

Using minutia features (e.g., minutia type, minutia neighborhoods, ridge descriptors) to more accurately describe the minutiae.

Using non-binary encodings to more smoothly handle noise by encoding a "score" for each minutia. Specifically locations close to the minutia are high score, and farther away are lower scores.

Using alignment free or globally aligned representations of the fingerprint, depending on the usage model and sensor parameters.

Using non-minutia features (e.g., ridge descriptors) instead of or in addition to minutia features.

Finally, note of course that other biometrics may also be used as inputs, and that multiple biometrics may be combined in a single enrollment or authentication.

We may represent the "norm" in the vector space in a number of forms including Hamming distance, Hamming distance of subsets, l_p distance (for any p), l_p distance of subsets, cosine similarity, etc. In one embodiment, we embed the notion of similarity between two vectors as a dot product between those two vectors.

4.2 SPDZ Multiparty Computation Overview

Recall the discussion of multiparty computation (MPC) from Section 2. The MPC component of our authentication protocol is responsible for performing the comparison algorithm. Specifically, as described above. one simple method of doing this is to compute a thresholded subset-sum. That is, given a: of values $x_i$ that are sharded across n servers, we want to compute:

$$\sum_i x_i > T$$

for some threshold T.

SPDZ is a protocol that performs computations on sharded data (as discussed in Section 2). It has all of the security requirements we require. For further details, see Marcel Keller, "MP-SPDZ: A Versatile Framework for Multi-Party Computation," available on Apr. 27, 2024 at https://eprint.iacr.org/2020/521.pdf on 2024.04.27, which is hereby incorporated herein by reference. Therefore, as discussed in Section 3, we can use the subset protocol to select the appropriate shards as input to the MPC protocol, and then the SPDZ protocol to compute the sum and threshold.

The threshold operation in our computation is an integer comparison, which is incredibly expensive in SPDZ (requiring a setup phase that takes several seconds of computation and communicates >50 MB of data per comparison). This cost would immediately render the protocol impractical.

However, we have identified a method to avoid the majority of this cost by leveraging the enrollment step. During enrollment, the original user U is by definition trusted by all of the servers. Therefore, U can generate all of the offline phase data on behalf of all of the servers, a process which (for technical reasons) removes the associated computation and communication complexity.

In embodiments using different MPC approaches (e.g., variants of SPDZ, etc.), these pre-generated data may vary. [See, e.g., Damgird, I., Keller, M., Larraia, E., Pastro, V., Scholl, P., and Smart, N. P. Practical covertly secure mpc for dishonest majority—or: breaking the SPDZ limits. In European Symposium on Research in Computer Security (2013), Springer, pp. 1-18.] They may further vary depending on the actual function being computed by the MPC protocol.

Therefore, we can run the SPDZ online protocol efficiently (with negligible computation cost and small quantities of data exchanged between servers).

5.0 Exemplary Embodiment Summary

In one embodiment, the final overall flow is the combination of the enrollment flow (depicted in FIG. 4) and the authentication flow (depicted in FIG. 6), discussed below.

An individual, who is user U, scans her biometric data and, via what we shall call a "first biometric computer," generates an encoding of the individual's biometric data. The encoding is used by the first biometric computer to generate shards of her biometric data as well as additional information that aids in the execution of the MPC protocol, but is not related to the U's biometric data. The shards and other data are distributed to the servers for use during the online authentication phase.

In the course of a later authentication process, a subject, who is user $U^I$, to be authenticated (and purporting to be the individual) scans her biometric data and, via what we shall call a "second biometric computer system," generates these biometric data and associated encoded template. Once this has occurred, $U^I$ generates shards of her biometric data and distributes them to the servers.

Finally, the servers independently run the online MPC protocol (e.g., SPDZ, FSS) using the offline data generated at enrollment to compute the biometric match function. At this point, each server has independently a shard of the output O, which are returned to $U^I$ who determines if the authentication was successful.

In another embodiment, the final overall flow is the combination of the enrollment flow (depicted in FIG. 4) and the authentication flow (depicted in FIG. 5).

An individual, who is user U, scans her biometric data and, via what we shall call a "first biometric computer," generates an encoding of the individual's biometric data. The encoding is used by the first biometric computer to generate encrypted shards of her biometric data as well as additional information that aids in the execution of the MPC protocol, but is not related to the U's biometric data. The encrypted shards and other data are distributed to the servers for use during the online authentication phase.

In the course of a later authentication process, a subject, who is user $U^I$, to be authenticated (and purporting to be the individual) scans her biometric data and, via what we shall call a "second biometric computer system," generates a confident subset of these biometric data and associated encoded template. Once this has occurred, $U^I$ and servers run the subset selection protocol, by which each server is provided a distinct set of decrypted shards of the encoded template, but is not provided with information by which such server could by itself determine the location of the decrypted shards.

Finally, the servers independently run the online MPC protocol (e.g., SPDZ) using the offline data generated at enrollment to compute the biometric match function. At this point, each server has independently determined the biometric match. $U^I$ is considered to be authenticated if all servers accept. Otherwise, $U^I$ is not authenticated.

Embodiments of the present invention are more efficient than previous multiparty computation approaches. For example, by (1) treating the enrolling user as a universally trusted individual among a set of mutually distrusting servers, and (2) using our secure subset selection algorithm, we are able to remove the expensive offline phase of interactive MPC protocols (such as computing multiplication triplets, etc.). By simplifying the authentication protocol to be a dot product, we reduce the number of rounds during the online phase to an acceptable number (for example, ~5 rounds, which can depend on precision).

In one embodiment, one or more servers enforce rate limiting or account lock-out if a condition is met. One skilled in the art would be familiar with such conditions. They may include, for example: too many incorrect authentications attempted, authentication attempts originating from certain locations, authentication attempts at certain times (e.g., time of day or date that indicates higher risk or uncharacteristic behavior for user), authentication attempts with varied identity assurance requirements, authentication attempts with factors that denote a certain risk level, etc. In one embodiment, after the condition is met, a security process is implemented. The security process may include, for example, preventing further authentication attempts for a period of time; notifying a user, server, or organization of suspicious behavior; and/or increasing the requirements for subsequent authentication, etc.

6.0 Additional Exemplary Embodiments

In another exemplary embodiment, the user may present multiple biometric modalities which are combined to form a single encoded template and/or confident subset.

In another embodiment, the user may present multiple biometric modalities, each of which is encoded and authenticated as described herein. Each generates a separate output value O. These output values are combined to determine whether the subject is authenticated as the individual.

In another embodiment, these output values combine to form a secret key.

In another embodiment, the same biometric shards may be enrolled at two (or more) separate thresholds by having U perform the offline phase for computing $f(E_T, P^I)$ at two (or more) thresholds and sending each of these sets along with her shards. During authentication, the desired threshold is selected, and the associated auxiliary data for computing $f(E_T, P^I)$ at the desired threshold are recalled and used in the authentication protocol. In one embodiment, authenticating at a lower threshold, which may have an easier user experience and lower False Reject Rate (FRR) but higher False Accept Rate (FAR), the subject is able to access lower risk functionality, such as viewing her account balance on a mobile banking app on her phone. In order for her to access certain functionality or authorize a higher risk transaction such as a high value transaction, she is required to authenticate at the higher threshold. In some embodiments, authenticating at the higher level requires additional factors, biometrics, or inputs.

In another embodiment, the shards and auxiliary data are encrypted at rest by one or more of the servers. This enables tiering the security.

In another exemplary embodiment, during the enrollment phase, an individual scans his/her fingerprints and enters his/her pin code on a device.

A first biometric computer system trusted by the individual determines the confident subset of the biometric input data. The first biometric computer system characterizes the confident subset into an ordered list or matrix of locations and unique biometric elements or e.g., minutiae. Every element is sharded by the first biometric computer system into n shards, where n is greater than 1. No shard characterizes even part of the biometric. In some embodiments, if an adversary obtained all but one of the n shards, the adversary still would not be able to recover any biometric information—all n shards would be needed. In another embodiment, a threshold number of shards is sufficient to recover biometric information.

In some embodiments, in order to obscure the location information, the first biometric computer system applies an ordering scheme. In some embodiments, the ordering scheme is based in part on the authentication inputs, such as the pin or fingerprints. In one embodiment, the sets of shards sent to servers each have the same ordering scheme applied. The first biometric computer system generates n sets of shards. The first biometric computer system also generates n unique and corresponding noise data sets to be used during the authentication phase.

In one embodiment, n is 2. The first set of shards is encrypted using key A. The second set of shards is encrypted using key B. The first biometric computer system sends to Server 1 a data collection that includes (a) the set of shards encrypted using key A, (b) key B, and (c) a noise data set. Similarly, the first biometric computer system sends to Server 2 a distinct data collection that includes (a) the set of shards encrypted using key B, (b) key A, and (c) a noise data set. It should be pointed out that Server 1 holds the key B that is used to encrypt the shards held by Server 2 and Server 2 holds the key A that is used to encrypt the shards held by Server 1, so that neither server is capable of decrypting the shards it holds using the key it holds. This is one example of the novel method of distributing shards and keys to different servers.

In one embodiment, the information sent by the processor is authenticated and/or signed. In the authentication phase, a subject purporting to be the individual scans his fingerprints and enters his pin code on a second device. A second biometric computer system coupled to the second device determines a confident subset of the biometric input data. In one embodiment, the second biometric computer system applies the ordering scheme to the confident subset. (In another embodiment, the second biometric computer system applies a reverse of the ordering scheme to the encrypted sets of shards instead.)

Server 1 sends the set of shards encrypted using key A to the second biometric computer system. Server 2 sends the set of shards encrypted using key B to the second biometric computer system. In one embodiment, the information sent by the server is authenticated. The information may be sent over a secure channel.

Using the confident subset, the second biometric computer system selects a new subset of each of the encrypted sets of shards.

In one embodiment, an ordering scheme (which may or may not be the same ordering scheme used previously) is applied to the new subsets. In another embodiment, locations are not included in the new subset. The second biometric computer system sends the new subset of shards that is encrypted using key A to Server 2. The second biometric computer system sends the new subset of shards that is encrypted using key B to Server 1.

In one embodiment, the information sent by the second biometric computer system is authenticated and/or signed. Server 1 uses key B to unencrypt the new subset of shards that is encrypted using key B. Server 2 uses key A to unencrypt the new subset of shards that is encrypted using key A. Now both servers have an unencrypted set of shards of the confident subset of biometrics from the subject purporting to be the individual. However, since location information is not included or not known, the compromise of even the unencrypted shards does not compromise the biometric information.

In one embodiment, Server 1 and Server 2 communicate with each other without sharing the unencrypted shards. The noise data sets are used to make this secure communication more efficient, including by increasing efficiency, requiring fewer computations, and by requiring less data to be exchanged between Server 1 and Server 2. This novel method enables secure communication among 2 or more servers in a very efficient way, leveraging auxiliary data (for example a noise data set) provided at the time of enrollment by a trusted party, which in some embodiments is the enrolling person or processor.

Once the computation is completed, Server 1 and Server 2 are able to determine (or have already determined) whether the subject is authenticated as the individual or not. In one embodiment, this determination is based on the combination of the shards revealing if the subject's confident subset was able to select sufficient unique biometric minutiae from the subject's data set, without the need for non-transient storage of the subject's data set. What is "sufficient" may depend on a threshold that can be adjusted, for example to reduce false reject rate (FRR) or false accept rate (FAR).

7.0 Using Asymmetrically Loaded Servers for Multi-Party Computing.

In various embodiments, not all the servers need to have the same resource requirements. In one embodiment, one server is heavily loaded and the other servers carry a reduced load. Such a configuration has various benefits, such as to help allow other organizations/entities/people to host some of the slimmed down servers, to improve security and threat model, etc.

The Badge protocol involves a secure multi-party computation among a set of servers. To enable this multiparty computation, the enrolling user U generates a set of one-time-values (OTVs) that are used to aid in the computation. As the name suggests, such values can only be used once—else the protocol becomes insecure.

As a result, the enrolling user must pre-generate a sufficient number of these values for the servers to use during authentication. These values must be stored at each server (a single "OTV" has one equal-sized piece of information that is stored on each of the MPC servers).

As a result, all servers require roughly the same amount of storage, and this storage is proportional to the number of OTVs.

It may be desirable to reduce the storage requirement for one or more servers—this is the intent of what we call "OTV Compression."

Because OTVs are—by design—indistinguishable from uniformly random values, traditional compression techniques designed for consumer applications will not result in any compression.

Instead, in an embodiment of the present invention, a dedicated technique found in the applied cryptography space is used: (pseudorandom number generator) PRNG compression. This technique "compresses" a large number of random-looking bits into a single PRNG seed that expanded in a PRNG function to generate such random bits.

NOTE: "Compresses" is in quotes above because, unlike normal compression, one cannot choose a specific random set of bits to be compressed. One instead chooses a random seed, and the guarantee is that the output of the PRNG function looks random.

Since the OTVs look random individually, we may use PRNG compression—subject, however, to the constraint that they have a joint relationship. For example, they may be are arithmetic shares of some value (the sum of all single OTVs across all MPC servers is constrained to be equal to a specific value). There are many other examples of such constraints including linear and Shamir shares, authenticated shares, verifiable shares, etc.

The foregoing constraint prevents using PRNG compression on all MPC servers, because the sum of the OTVs across servers could not then be constrained to the desired value (since it would be random). In one embodiment, we use PRNG compression for the OTV on all but one server, and configure the last server to use an uncompressed OTV so that the sum of the OTV across all servers can be constrained to the specific value. In such an embodiment, one server stores a fully uncompressed OTV, and each of the other n-1 servers stores a single seed (e.g., 128 bits).

An embodiment of the foregoing type can (1) minimize resource requirements (e.g., compute, resource) of the servers so that it is easy for anyone to host and maintain the servers and (2) minimize the amount of interaction between servers. (As the physical distance between servers grows, communication latency & throughput between servers becomes slower.) An embodiment of the type described in the preceding paragraph would reduce the overhead associated with deploying a large number of servers that would increase the probability that at least one of the servers would remain uncompromised. Moreover, these servers would ideally be located in different cloud providers, states, countries, or continents, to diversify the trust relations between various servers. For example, it may be desirable to have a three-server deployment where one of the servers is in the United States in Google Cloud, one of the servers is in Sweden in Amazon Web Services, and the last one is in Singapore in Microsoft Azure.

Different MPC servers may be hosted at different scales for different purposes, in various embodiments. For example:

(A) A sophisticated cloud service provider may host an MPC server in public cloud (e.g., AWS, Azure, GCP, Zscaler, Cloudflare, etc.) in a high available configuration with zonal and regional failover, with sophisticated load balancing and horizontal elasticity.

(B) A network infrastructure provider (e.g., Cisco, Arista, Broadcom, Thales) may host MPC servers on existing network infrastructure such as routers/switches, hardware security modules, etc. Switches and routers are just specialized computers, so a router/switch could be an MPC server itself. Routers also run firewall software, but sometimes the firewall might run separately. Another type of infrastructure that could host an MPC server is firewalls/web application firewall, etc.

(C) A privacy-focused organization may host an MPC server in a dedicated datacenter, with little-to-no elasticity or regional failover capabilities. The seeds may be backed up locally or off-site.

(D) A community of developers and power users may host a MPC server using personal or aggregate computational resources. These resources may be in the form of a home server, Raspberry Pi (or equivalent single-board computer). There may be a manual backup.

(E) A single user might host a personal MPC server using their phone/PC, or an old PC, old repurposed smartphone, IoT devices, etc.

(F) An enterprise/consumer hardware/software vendor may configure deployed devices/applications (e.g., applications, phones, computers, automotive, IoT devices, customer on-premise infrastructure) as MPC servers. Note that in certain embodiments, because MPC servers do not learn information about individuals' data, any user's device may be configured to operate as a MPC server for any other user. The identity of the device chosen as the MPC server may be hidden from the provider.

A given system may comprise all or a subset of the above configurations for some or all of the MPC servers, including in combinations, as would be understood by one skilled in the art. Flexibility of MPC hosting allows for scaling in accordance with individual- and organization-level risk tolerance. In one embodiment, the MPC servers are explicitly designed to be easy and inexpensive to deploy and maintain. In one embodiment, this is achieved by keeping the system requirements for MPC servers as small as possible and minimizing the complexity of the MPC servers. In one embodiment, for example, each MPC server needs only (i) a small amount of state (less than 1 KB); (ii) a few cryptographic keys; and (iii) capability of performing only inexpensive computation (simple additions and multiplications) for a single authentication. These requirements are simple enough to support virtually any computing environment.

As may be inferred from this discussion there are benefits in deploying a heterogeneous infrastructure for server hosting. It is more difficult for an attacker to compromise all servers simultaneously if some of the servers are running with different infrastructures. The likelihood of exploitable vulnerabilities being present on all servers decreases if some servers run on different infrastructure. This approach has the effect of minimizing correlation among attack surfaces available to malicious adversaries.

8.0 Technical Description of Asymmetrically Loaded Servers for Multi-Party Computing As described in the immediately preceding section, in some embodiments, for multi-party computing, each server is assigned and stores a randomly generated OTV, under a condition wherein the sum of the OTVs is constrained to a specific value. In a further related embodiment using n servers, each of up to n-1 of the servers instead of being assigned an OTV is assigned a seed by which the server uses a pseudo-random number generator (PRNG) function to generate its corresponding OTV. For example, to share values x_1, . . . , x_m for n servers, the user does the following:

Generate n-1 random seeds s_1, . . . , s_{n-1} for use by the PRNG function by each of the n-1 servers. The seeds are typically 128-bit or 256-bit random values.

For each x_j, compute [x_j]_i=PRNG(s_i||j). This step determines the OTV for use by each of the n-1 servers.

For each x_j, compute [x_j]_n=x_j−sum([x_j]_i). This step determines the value of the OTV for server n, which is assigned and delivered to server n.

Send s_i to server i, and the shares {[x_j]_n} to server n. The step sends the seeds to the n-1 servers and, to server n, the step sends the OTV determined for server n.

When one of the n-1 servers server needs to use the share for value x_j, it can just compute it "on the fly", as PRNG(s_i||j).

Effectively, with this embodiment, each of the n-1 servers needs to store only a single random seed, regardless of the number of values the users are sharing. Only one of the servers needs to store the full-sized OTV. This configuration makes the storage requirements of all but one server nearly trivial; this configuration is analogous to asymmetric computation, but here for storage.

Figure 7:
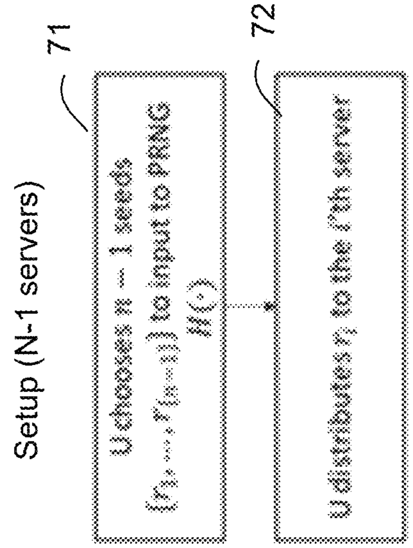
FIG. 7 is a diagram showing logical flow by which n-1 servers, of a total of n servers, are loaded asymmetrically for use in multi-party computing, wherein each server employs a one-time value, in accordance with an embodiment of the present invention.
Figure 8:
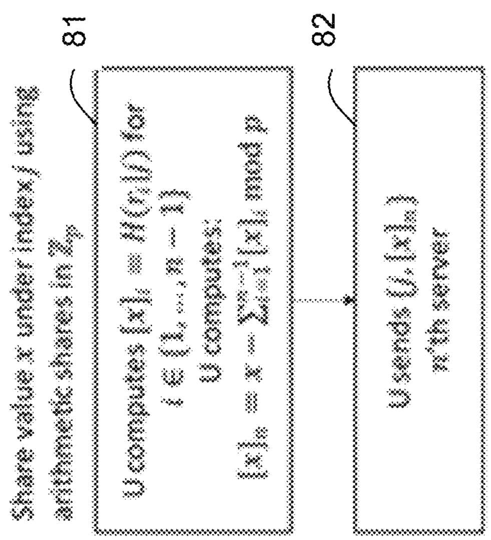
FIG. 8 is a diagram showing logical flow by which server n (the last server of server 1, 2, . . . n) is loaded for use in the same multi-party computing context as the n-1 servers of FIG. 6, wherein each server employs a one-time value, in accordance with an embodiment of the present invention.
Figure 9:
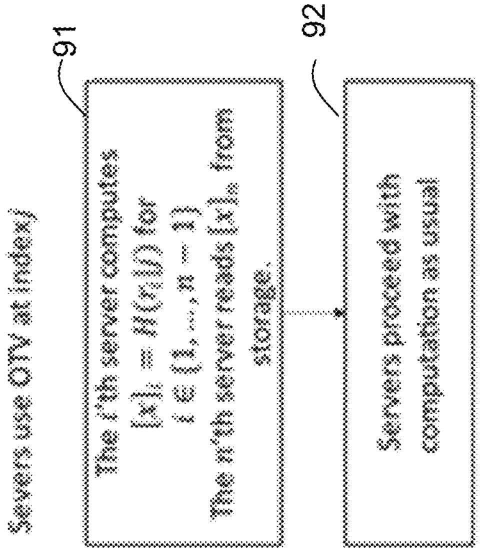
FIG. 9 is a diagram showing logical flow by which the n servers carry out multi-party computing using their corresponding one-time values, in accordance with an embodiment of the present invention.

The use of asymmetrical loading for multi-party computing as described above is illustrated by the following description of FIGS. 7-9.

FIG. 7 is a diagram showing logical flow by which n-1 servers, of a total of n servers, are loaded in an asymmetrically light manner (compared to server n) for use in multi-party computing, wherein each server has a one-time value, in accordance with an embodiment of the present invention. Process 71 begins with user U, which may, for example, correspond to the client computer of the individual whose biometric data has been obtained from a first transducer, and thereafter sharded and distributed to the n servers to determine whether to authenticate a subject claiming to be the individual. In process 71, the user U chooses a series of n-1 seeds for use by n-1 of the n servers. In process 72, U distributes a corresponding seed $r_i$ to each server $r_i$ of the n-1 servers and also delivers the pseudorandom function H to each server. In the course of the multi-party computing, each of these servers will use its seed $r_i$ to compute a one-time value that is the pseudorandom function $H(r_i)$. The function H is developed in a manner so that the distribution of the one-time values $H(r_i)$ is indistinguishable from uniformly random values, FIG. 8 is a diagram showing logical flow by which server n (the last server of servers 1, 2, . . . n-1, n) is loaded for use in the same multi-party computing context as the n-1 servers of FIG. 6, wherein each server employs a one-time value, in accordance with an embodiment of the present invention. In this multi-party computing context the sum of all single OTVs across all MPC servers is constrained to be equal to a specific value x. Since the function H specifies the OTV for each of the n-1 servers, the OTV for server n must be calculated so as to satisfy the constraint. Accordingly, in process 81, U computes the values $H(r_i)$ for all seeds for each of the servers i=1, . . . , n-1 corresponding therefore to the OTVs calculated for each of these servers. The total of those OTVs is subtracted from the specific value x to derive the OTV for server n. In process 82, U sends this calculated OTV to server n for use in the multi-party computing, and the calculated OTV for server n is placed by server n in local storage.

FIG. 9 is a diagram showing logical flow by which the n servers carry out multi-party computing using their corresponding one-time values, in accordance with an embodiment of the present invention. In process 91, each of servers 1, . . . , n-1 computes its corresponding OTV using the function H as applied to the seed it received from U. Server n recalls its OTV from its local storage. In process 92, the servers use these OTVs in the normal manner for multi-party computing, as described, for example in section 4.2 above, SPDZ multiparty computation overview.

Figure 10:
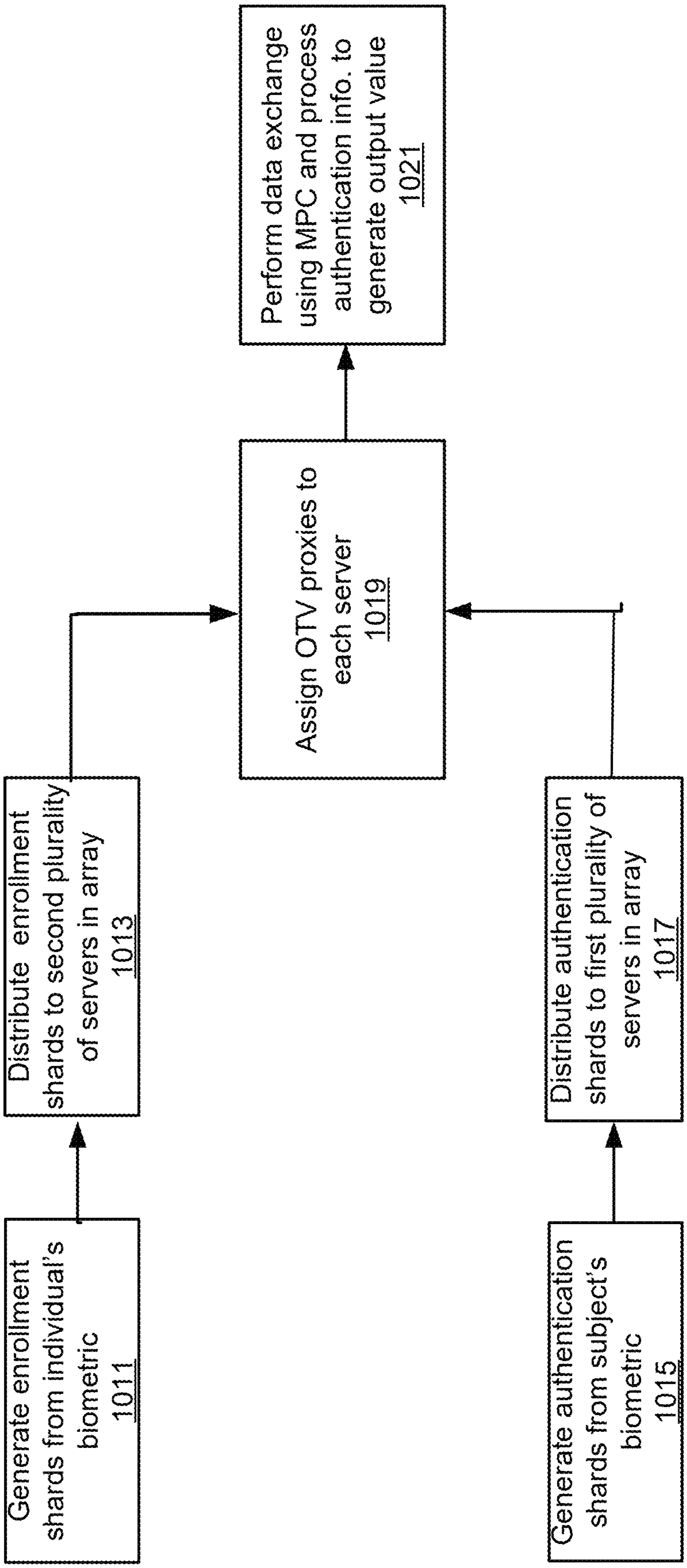
FIG. 10 is a diagram showing logical flow for an embodiment of the present invention, similar to that of FIG. 9, wherein the array of servers includes first and second pluralities of servers.

FIG. 10 is a diagram showing logical flow for an embodiment of the present invention, similar to that of FIG. 9, wherein the array of servers includes first and second pluralities of servers. In this embodiment, a subject is to be authenticated as an individual whose biometric data has been previously obtained. In these embodiments, in process 1011, enrollment shards from a digital electronic signal characterizing a biometric of the subject are generated and distributed to and stored by the second plurality of servers in an array of servers. Also, in process 1015, authentication shards from a digital electronic signal characterizing a biometric of the individual are generated and distributed to and stored by the first plurality of servers in the array of servers.

Next, in process 1019, each server in the first and second pluralities of servers is caused to be assigned a proxy for a one-time value, and to store the proxy, for use only once in a multiparty computation with other servers in the array. In this arrangement, (i) the one-time values are indistinguishable from uniformly random values, (ii) each proxy for a one-time value is selected from the group consisting of the one-time value itself and a seed for the one-time value, (iii) the sum of the one-time values distributed to the first plurality of servers is constrained to have a first specific value, (iv) the sum of the one-time values distributed to the second plurality of servers is constrained to have a second specific value, and (v) in each of the first and second pluralities at least one of the proxies for the one-time value is the one-time value itself.

Once the first and second pluralities of servers have been set up, there follows, in process 1021, performance of a data exchange process, which includes multiparty computation, involving a subset of the first and second pluralities of servers in the array, to develop information relating to authentication of the subject, and the authentication information is processed to generate an output value corresponding to a determination whether the subject is authenticated as the individual.

9.0 Updating after Successful Authentication

Updating enrollment data. When a successful authentication has occurred, using procedures as described above (for example in section 5.01), it is known that the subject seeking to be authenticated as the enrolled individual is in fact the enrolled individual. Post-authentication knowledge that the subject corresponds to the enrolled individual allows for implementation of any of a range of post-authentication processes, including updating of the enrollment data associated with biometric data of the individual to handle changes over time of such data. Such changes might be occasioned by circumstances such as aging of the individual, hair growth, haircuts, baldness, wearing of eye-glasses, etc.

Post-authentication methods of updating the individual's biometric enrollment data include downloading the user's encrypted biometric template, or decrypting the user's biometric data with a derived key, or doing some update to that template (e.g., weighted average, using machine learning, etc.). Updating the enrollment data has the effect of making the authentication system more robust in being able to withstand physical changes in the person that would otherwise hinder biometric authentication.

Addressing OTV consumption. One of the security features of the authentication embodiments described above is based on the use of one-time-values (OTVs) in connection with multiparty computing. In various embodiments, these values are distributed across servers, used a single time in multiparty computing and then discarded.

In various embodiments of the present invention, once a single server discards an OTV, the corresponding OTVs on all other servers become useless to an adversary, regardless of how powerful such an adversary might be, since the adversary now lacks any information concerning the individual's biometric. However, this powerful concept comes with a drawback in some embodiments—the above authentication embodiments consume a finite, non-zero number of resources (in the form of OTVs). Meanwhile, in the course of enrollment, the enrolling user's client computing facility can provide only a finite number of OTVs for use during authentication. Therefore, after some finite number of authentication attempts, an authentication system in accordance with embodiments of the present invention runs out of OTVs. Under that condition, the user—as a result of the intentional design of the authentication system—cannot re-derive that key ever again—the key is lost—with a result akin to a factory reset on one's phone after some number of failed logins.

One way of addressing this problem involves considering that when authentication is successful, it has been determined that the user can now be trusted. In such a situation, namely after a successful authentication, the user's OTVs can be replenished or other steps can be taken to update data used in authentication.

To update authentication data after a successful authentication, one may choose to:

(a) replace only missing OTVs;

(b) replace all OTVs;

(c) generate OTVs based on the updated biometric template and distribute them to the servers; or (d) as discussed above, update the enrollment biometric data.

Note that updating the enrollment biometric data, as per item (d), will have the effect of updating the enrollment data shards that are distributed to the second array of servers for use in multiparty computing.

Figure 11:
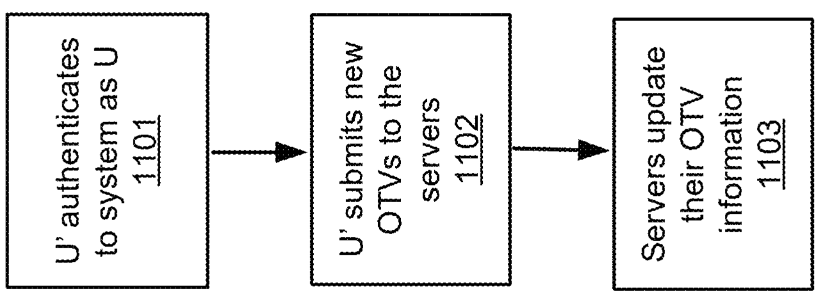
FIG. 11 is a logical flow diagram illustrating processes involved in updating OTVs after a successful authentication.

FIG. 11 is a logical flow diagram illustrating processes involved in updating OTVs after a successful authentication. Ahead of process 1101, it is assumed that user U has enrolled as the individual for authentication purposes. In process 1101, user U' is a subject seeking to be authenticated as the individual U previously enrolled, and in this case the authentication is successful, so the system knows that user U is present as U'. In process 1102, user U' is therefore able to submit and does submit new OTVs to the servers. In process 1103, the servers update the OTV information and are then, with replenished OTVs, the servers can undertake further authentication processing.

Accepting a plurality of enrollments from an individual. Various embodiments of the present invention are configured to accept a plurality of distinct enrollments from the same individual without imposing or creating any linkage from one such enrollment to another such enrollment. In other words, in these embodiments, neither the authentication system nor an adversary can determine whether any two accounts are established by the same user or established by two different users. Although this property seems peculiar, has the benefit of respecting privacy of the individual using the system for authentication. Moreover, this property it is in fact critical for allowing a user to perform important security tasks including updating the user's OTVs, updating and revoking biometrics, disabling and deleting accounts, and enrolling in a manner to support distinct relying parties.

Figure 12:
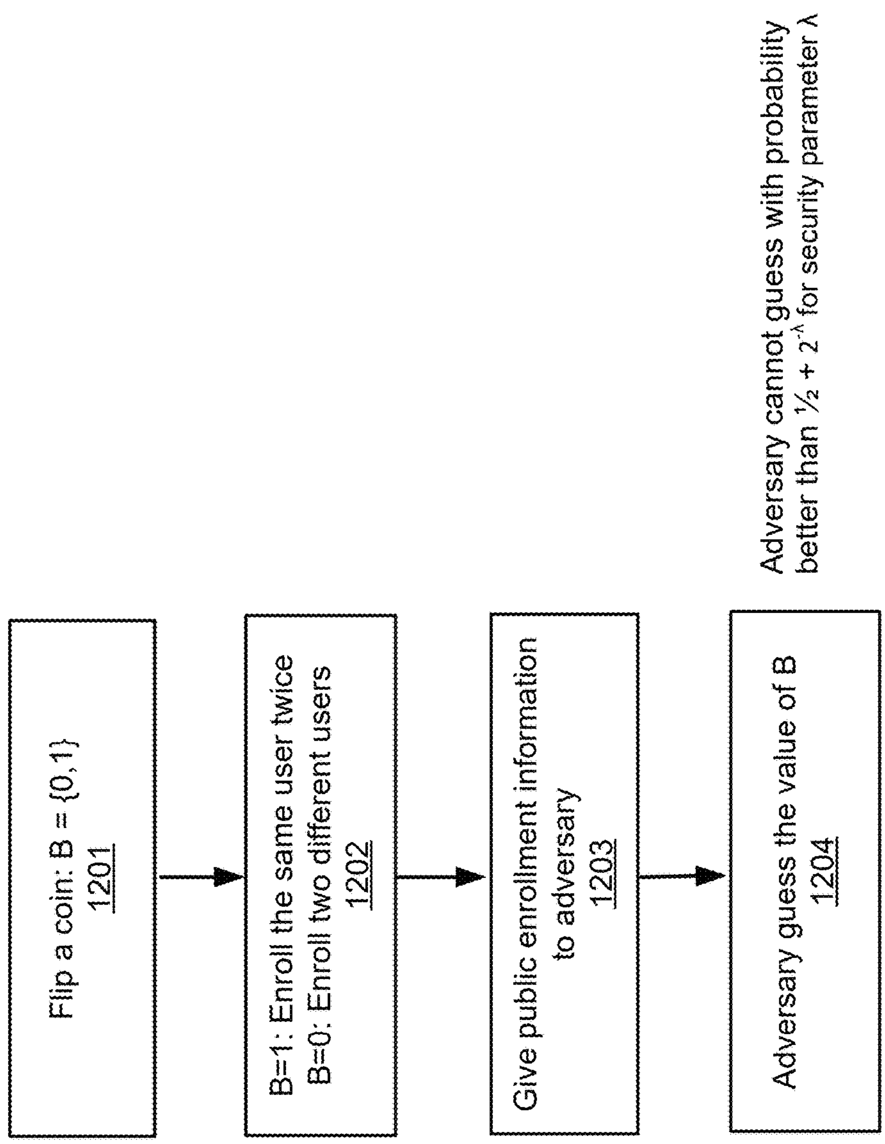
FIG. 12 is a logical flow diagram illustrating aspects of accepting a plurality of enrollments from an individual.

FIG. 12 is a logical flow diagram illustrating aspects of accepting a plurality of enrollments from an individual. In process 1201, consider a function, such as a coin flip, having a first outcome B=0 and a second outcome B=1. In process 1202, we consider the outcome B=1, wherein the same user is enrolled twice and the outcome B=2, wherein two different users are enrolled. In process 1203, public enrollment information is provided to an adversary, and in process 1204, the adversary is challenged to guess the value of B. Under these circumstances, the adversary cannot guess with probability better than $\frac{1}{2}+2^{-\lambda}$ for security parameter $\lambda$. Put another way, the authentication system does not internally possess the information, nor does it inform the public or a given relying party whether a user has enrolled separately for purposes of authentication to another relying party.

REFERENCES

1. Beaver, D. Efficient multiparty protocols using circuit randomization. In *Annual International Cryptology Conference* (1991), Springer, pp. 420-432.
2. Ignatenko, T., and Willems, F. M. Information leakage in fuzzy commitment schemes. *IEEE Transactions on Information Forensics and Security* 5, 2 (2010), 337-348.
4. Micali, S., and Rogaway, P. Secure computation. In *Annual International Cryptology Conference* (1991), Springer, pp. 392-404.
5. Shamir, A. How to share a secret. *Communications of the ACM* 22, 11 (1979), 612-613.
6. Stoianov, A., Kevenaar, T., and Van der Veen, M. Security issues of biometric encryption. In *Proceedings of Toronto International Conference on Science and Technology for Humanity* (2009), pp. 34-39.
7. Uludag, U., Pankanti, S., and Jain, A. K. Fuzzy vault for fingerprints. In *International Conference on Audio-and Video-Based Biometric Person Authenti-cation* (2005), Springer, pp. 310-319.
8. Yao, A. C.-C. Protocols for secure computations. In *FOCS* (1982), vol. 82, pp. 160-164.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method using biometric data to authenticate a subject as an individual whose biometric data has been previously obtained, the method implemented by computer processes, comprising:

causing generation of authentication shards from a digital electronic signal characterizing a biometric of the subject and causing the authentication shards to be distributed to, and stored by, a first plurality of servers in an array of servers, wherein, in an enrollment phase, the individual's biometric data has been formed into enrollment shards that have been distributed to, and stored by, a second plurality of servers in the array of servers;

causing assignment and distribution of a proxy for a one-time value to each server in the array of servers, and causing storage of the proxy by each server, wherein (i) the one-time values are individually indistinguishable from uniformly random values, (ii) each proxy for a one-time value is selected from the group consisting of the one-time value itself and a seed for the one-time value, (iii) the one-time values distributed to the first plurality of servers is constrained by a first specific value, (iv) the one-time values distributed to the second plurality of servers is constrained by a second specific value, and (v) in each of the first and second pluralities at least one of the proxies for the one-time value is the one-time value itself;

causing performance of a data exchange process among a first subset of servers of the first plurality of servers and a second subset of servers of the second plurality of servers, the data exchange process comprising: performing a multiparty computation to develop authentication information based on (i) the enrollment shards stored by the second subset of servers, (ii) the authentication shards stored by the first subset of servers, and (iii) the proxy assigned and distributed to, and stored by, each server in the first subset of servers and the second subset of servers;

causing processing of the authentication information to generate an output value corresponding to a determination whether the subject is authenticated as the individual; and after a successful authentication of the subject as the individual, causing an update of authentication-related data used by a third subset of servers in the array of servers.

2. A method according claim 1, wherein causing an update of authentication-related data used by the third subset of servers in the array of servers includes causing replacement of an OTV set of one-time values used by servers in the array of servers.

3. A method according to claim 2, wherein causing replacement of the OTV set of one-time values used by servers in the array of servers includes causing identification of servers in the array that are missing one-time values and causing replacement of the one-time values used by the identified servers.

4. A method according to claim 2, wherein causing replacement of the OTV set of one-time values used by servers in the array of servers includes replacing all one-time values used by servers in the array of servers.

5. A method according to claim 2, wherein causing an update of authentication-related data used by servers in the array of servers further includes (i) causing an update of the individual's biometric data used in the enrollment phase with data obtained in the course of the successful authentication and causing a corresponding update of the enrollment shards distributed to the second plurality of servers, and (ii) causing replacement of the OTV set of one-time values used by servers based on the updated enrollment data.

6. A method according to claim 1, wherein causing an update of authentication-related data used by servers in the array of servers includes (i) causing an update of the individual's biometric data used in the enrollment phase with data obtained in the course of the successful authentication, (ii) formation of updated enrollment shards based on the updated biometric data of the individual, and (iii) distribution of the updated enrolment shards to the second plurality of servers.

7. A method according to claim 1, wherein causing generation of authentication shards from the digital electronic signal includes generating a set of authentication vectors in metric space from the digital electronic signal, and processing the set of authentication vectors to form the authentication shards.

8. A method according to claim 7, wherein causing generation of authentication shards from the digital electronic signal includes using a first machine learning model to generate the set of authentication vectors from the digital electronic signal.

9. A method according to claim 7, wherein the individual's biometric data has been used to generate a set of enrollment vectors in metric space and the set of enrollment vectors has been used to generate the enrollment shards.

10. A method according to claim 9, wherein a second machine learning model has been used to generate the enrollment shards.

11. A method according to claim 10, wherein the second machine learning model employs a set of neural networks.

12. A method according to claim 11, wherein the set of neural networks defines a deep learning model.

13. A method according to claim 8 wherein the first machine learning model employs a set of neural networks.

14. A method according to claim 1, wherein the individual is inanimate, having a unique identity, and the subject is inanimate, purporting to have the unique identity of a specific individual.

15. A method according to claim 1, wherein causing processing of the authentication information to generate an output value includes, in the event of a successful authentication of the subject as the individual, authentication, of the authenticated subject, to an outside server that is distinct from any server in the array of servers.

16. A method according to claim 15, wherein authentication, to the outside server, of the authenticated subject is provided by a key arrangement selected from the group consisting of a derived SSH key, a client SSL certificate and key, an Enterprise 802.11 certificate and key, an OAUTH token, and a one-time password.

17. A method according to claim 16, wherein the key arrangement is chained, so that a first one of the key arrangements is required to access a second one of the key arrangements.

18. A method according to claim 16, wherein the key arrangement is configured to provide access to a digital wallet.

19. A method according to claim 16, wherein the key arrangement includes a set of private keys corresponding to a set of certificates issued by a set of authorities that are trusted by a set of relying parties.

20. A method according to claim 1, wherein, after a successful authentication of the subject as the individual, causing an update of authentication-related data used by a third subset of servers in the array of servers includes authorizing a payment transaction involving the individual.

21. A method using biometric data to authenticate a subject as an individual whose biometric data has been previously obtained, the method implemented by computer processes, comprising:

first, causing generation of authentication shards from a digital electronic signal characterizing a biometric of the subject by using a first machine learning model to generate a set of authentication vectors in metric space, and processing the set of authentication vectors into authentication shards, and second, causing the authentication shards to be distributed to, and stored by, a first plurality of servers in an array of servers, wherein, in an enrollment phase, the individual's biometric data has been formed into enrollment shards that have been distributed to, and stored by, a second plurality of servers in the array of servers;

causing assignment and distribution of a proxy for a one-time value to each server in the array of servers, and causing storage of the proxy by each server, wherein (i) the one-time values are individually indistinguishable from uniformly random values, (ii) each proxy for a one-time value is selected from the group consisting of the one-time value itself and a seed for the one-time value, (iii) the one-time values distributed to the first plurality of servers is constrained by a first specific value, (iv) the one-time values distributed to the second plurality of servers is constrained by a second specific value, and (v) in each of the first and second pluralities at least one of the proxies for the one-time value is the one-time value itself;

causing performance of a data exchange process among a first subset of servers of the first plurality of servers and a second subset of servers of the second plurality of servers, the data exchange process comprising: performing a multiparty computation to develop authentication information based on (i) the enrollment shards stored by the second subset of servers, (ii) the authentication shards stored by the first subset of servers, and (iii) the proxy assigned and distributed to, and stored by, each server in the first subset of servers and the second subset of servers;

causing processing of the authentication information to generate an output value corresponding to a determination whether the subject is authenticated as the individual.

22. A method according to claim 21, wherein the individual's biometric data has been processed by using a second machine learning model to generate a set of enrollment vectors in metric space and the set of enrollment vectors has been used to generate the enrollment shards.

* * * * *